(12) United States Patent
Leefer et al.

(10) Patent No.: US 10,887,023 B1
(45) Date of Patent: Jan. 5, 2021

(54) VARIABLE BANDWIDTH FREE-SPACE OPTICAL COMMUNICATION SYSTEM FOR AUTONOMOUS OR SEMI-AUTONOMOUS PASSENGER VEHICLES

(71) Applicant: Glydways Inc., San Francisco, CA (US)

(72) Inventors: Nathan Leefer, San Francisco, CA (US); Gregory A. Springer, Los Altos, CA (US)

(73) Assignee: Wayfarer, Inc., South San Francisco, CA (US)

( * ) Notice: Subject to any disclaimer, the term of this patent is extended or adjusted under 35 U.S.C. 154(b) by 0 days.

(21) Appl. No.: 16/591,209

(22) Filed: Oct. 2, 2019

Related U.S. Application Data

(60) Provisional application No. 62/744,070, filed on Oct. 10, 2018.

(51) Int. Cl.
| | | |
|---|---|---|
| *H04B 10/80* | (2013.01) | |
| *H04W 4/46* | (2018.01) | |
| *H04B 10/114* | (2013.01) | |
| *H04B 10/50* | (2013.01) | |
| *G05D 1/00* | (2006.01) | |

(52) U.S. Cl.
CPC ......... *H04B 10/80* (2013.01); *H04B 10/1143* (2013.01); *H04W 4/46* (2018.02); *G05D 1/0088* (2013.01); *G05D 2201/0212* (2013.01); *H04B 10/502* (2013.01)

(58) Field of Classification Search
CPC combination set(s) only.
See application file for complete search history.

(56) References Cited

U.S. PATENT DOCUMENTS

| | | | |
|---|---|---|---|
| 2005/0129410 A1* | 6/2005 | Wilsey | H04B 10/1143 398/153 |
| 2015/0336502 A1* | 11/2015 | Hillis | G06F 3/017 701/23 |
| 2016/0094290 A1* | 3/2016 | Nishino | H04B 10/07953 701/517 |
| 2016/0209842 A1* | 7/2016 | Thakur | G05D 1/0088 |
| 2017/0123419 A1* | 5/2017 | Levinson | G05D 1/0022 |
| 2017/0123421 A1* | 5/2017 | Kentley | B60W 30/00 |
| 2017/0123422 A1* | 5/2017 | Kentley | B60L 15/20 |
| 2017/0316333 A1* | 11/2017 | Levinson | G06K 9/00805 |
| 2020/0008028 A1* | 1/2020 | Yang | H04W 4/48 |
| 2020/0017133 A1* | 1/2020 | Berger | B61L 27/0005 |
| 2020/0019761 A1* | 1/2020 | Kang | G06K 9/00791 |
| 2020/0084193 A1* | 3/2020 | Beaurepaire | H04W 4/46 |

* cited by examiner

*Primary Examiner* — Omar S Ismail
(74) *Attorney, Agent, or Firm* — Brownstein Hyatt Farber Schreck, LLP

(57) ABSTRACT

A passenger vehicle optical communication system includes a source vehicle including a light source and an endpoint vehicle including a camera. The source vehicle transmits a series of patterns using the light source to communicate, as one example, state information to the endpoint vehicle.

20 Claims, 17 Drawing Sheets

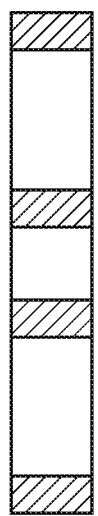
FIG. 5B
FIG. 5C

VARIABLE BANDWIDTH FREE-SPACE OPTICAL COMMUNICATION SYSTEM FOR AUTONOMOUS OR SEMI-AUTONOMOUS PASSENGER VEHICLES

CROSS-REFERENCE TO RELATED APPLICATION(S)

This application is a nonprovisional patent application f and claims the benefit of U.S. Provisional Patent Application No. 62/744,070, filed Oct. 10, 2018 and titled "Variable Bandwidth Free-Space Optical Communication System for Autonomous or Semi-Autonomous Passenger Vehicles," the disclosure of which is hereby incorporated herein by reference in its entirety.

FIELD

Embodiments described herein relate to passenger vehicles and, in particular, to variable bandwidth free-space optical communication systems for autonomous or semi-autonomous passenger vehicles.

BACKGROUND

A passenger vehicle can include a communication system to wirelessly transact data or information with other nearby passenger vehicles. Such systems are referred to as "passenger vehicle communication systems." The data transacted by passenger vehicle communication system can be used to inform or modify one or more operations or settings of a passenger vehicle. As an example, a "leading" passenger vehicle, followed by a "trailing" passenger vehicle, can communicate to the trailing passenger vehicle that the leading passenger vehicle will decelerate. In response, the trailing passenger vehicle may decelerate at a rate substantially matching that of the leading passenger vehicle, thereby maintaining a safe distance separating the leading and trailing passenger vehicle.

However, conventional passenger vehicle communication systems typically transact data between passenger vehicles across high-frequency radio bands using conventional wireless communication technologies or protocols such as Wi-Fi, Bluetooth, cellular communications, and so on. These and other conventional passenger vehicle communication systems are highly susceptible to environmental noise and electromagnetic interference and, as a result, are often unsuitable to or unsafe to rely upon for safety-critical operations or tasks of passenger vehicles, such as braking, decelerating, accelerating, changing lanes, and so on.

SUMMARY

Embodiments described herein reference an autonomous transport system that includes multiple passenger vehicles communicably coupled via an optical communication system. The optical communication system coupling each passenger vehicle can be used to propagate information between passenger vehicles.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 5B-5C each depict example one-dimensional patterns that can be transmitted by the source vehicle of the passenger vehicle optical communication system of FIG. 5A.

Figure 1A:
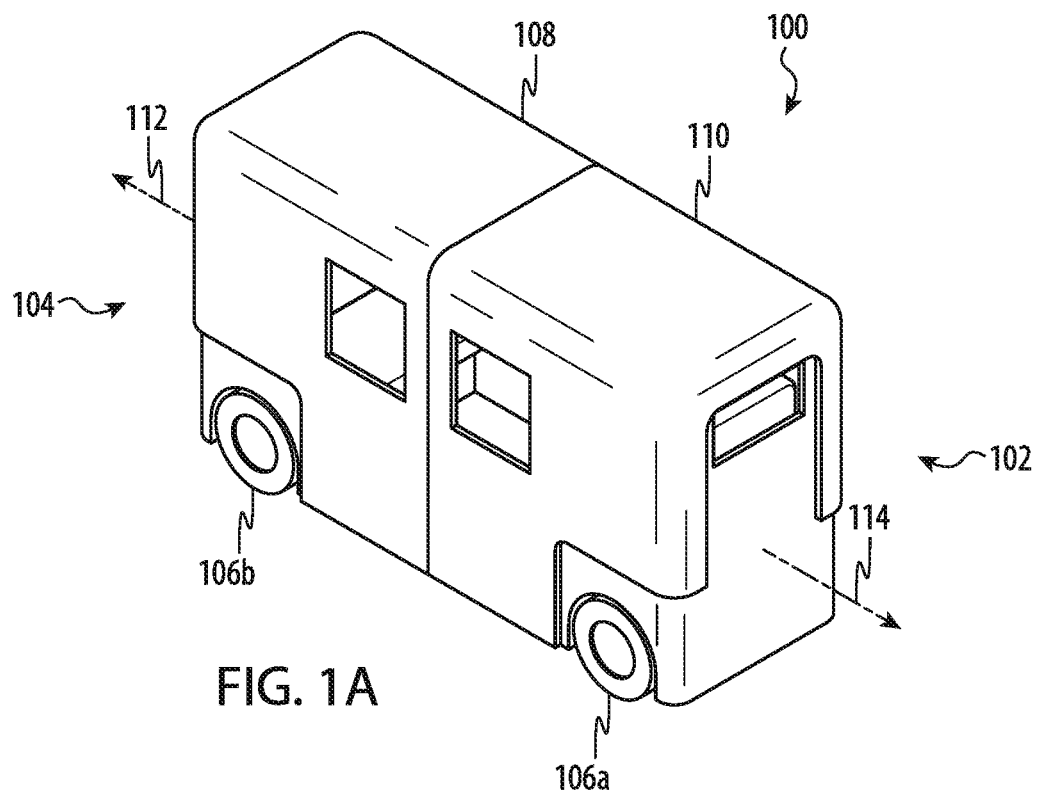
FIGS. 1A-1B depict an example passenger vehicle.

The use of cross-hatching or shading in the accompanying figures is generally provided to clarify the boundaries between adjacent elements and to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Similarly, certain accompanying figures include vectors, rays, traces and/or other visual representations of one or more example paths—which may include reflections, refractions, diffractions, and so on, through one or more mediums—that may be taken by one or more photons originating from one or more light sources shown or, or in some cases, omitted from, the accompanying figures. It is understood that these simplified visual representations of light are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments herein are generally directed to vehicles that may be used in a passenger transportation system in which numerous vehicles may be autonomously operated to transport passengers and/or freight. Such as system is referred to herein as an "autonomous transportation system."

For example, an autonomous transportation system or service may provide a fleet of vehicles that operate along a roadway to pick up and drop off passengers at either pre-set locations or stops, or at dynamically selected locations (e.g., selected by a person via a smartphone). In other cases, an autonomous transportation system may be configured to transport goods in addition to, or in place of, one or more passengers. For example, in some cases, an autonomous transportation system can transport passengers during the day and goods at night. For simplicity of description, the embodiments that follow reference an autonomous transportation system that includes one or more "passenger vehicles" but it may be appreciated that carriage of passengers is merely one example service that may be performed by a vehicle of an autonomous transportation system, such as described herein.

Passenger vehicles in an autonomous transportation system, such as described herein, may be configured to operate independently and autonomously (i.e., without substantive input or control from a human operator and/or a central, stationary, controller). As used herein, the term "autonomous" may refer to a mode or scheme in which a vehicle can operate in service to transport goods and/or passengers without continuous, manual control by a local or remote human operator.

For example, passenger vehicles may navigate along a roadway (and without an on-board driver) using a system of sensors that guide the passenger vehicle, and a system of automatic drive and steering mechanisms that control the speed and direction of the passenger vehicle. Autonomous operation, such as described herein, need not exclude all human or manual operation—whether local or remote—of the passenger vehicles or of the autonomous transportation system as a whole.

For example, human operators may be able to intervene in the operation of a passenger vehicle for safety, convenience, testing, or other purposes. Such intervention may be local to the passenger vehicle, such as when a human operation (driver) takes controls of the passenger vehicle, or remotely, such as when a human operator sends commands to the passenger vehicle via a remote control system.

Similarly, some aspects of the passenger vehicles may be controlled by passengers of the passenger vehicles. For example, a passenger in a passenger vehicle may select a target destination, a route, a speed, control the operation of the doors and/or windows, or the like. Accordingly, it will be understood that the terms "autonomous" and "autonomous operation" do not necessarily exclude all human intervention or operation of the individual passenger vehicles or of the overall transportation system.

The passenger vehicles in an autonomous transportation system as described herein may be operated on a public roadway, or on a closed system of lanes. A closed system of lanes may, for example, include a lane or set of lanes that is adjacent and/or offset from a public roadway and, in some cases, shares a common road surface. For simplicity of description, the surface on which a passenger vehicle such as described herein is referred to, simply, as a "roadway."

In cases where a roadway is a closed system of lanes, the lanes may be customized for the operation of the passenger vehicles and the autonomous transportation system as a whole. For example, the lanes of the roadway may have markers, signs, fiducials, or other objects or components on, in, or proximate the lanes to help the passenger vehicles operate.

For example, passenger vehicles may include sensors that can sense magnetic markers that are embedded in the road surface to help guide the passenger vehicles and allow the passenger vehicles to determine their location, speed, orientation, or the like. As another example, the roadway may have signs or other indicators that can be detected by cameras on the passenger vehicle and that provide information such as location, speed limit, traffic flow patterns, and the like. In other cases, passenger vehicles may include sensors that can sense metallic markers of different compositions or alloys that are embedded in the road surface to help guide the passenger vehicles and allow the passenger vehicles to determine their location, speed, orientation, or the like.

The passenger vehicles in an autonomous transportation system may include various sensors, cameras, communications systems, processors, and/or other components or systems that help facilitate autonomous operation. For example, the passenger vehicles may include sensors that detect magnets, metals, or other markers embedded in the road surface and which help the passenger vehicle determine its location, position, and/or orientation on the roadway.

The passenger vehicles in the autonomous transportation system may be designed to enhance the operation and convenience of the autonomous transportation system. For example, a primary purpose of the autonomous transportation system may be to provide comfortable, convenient, rapid, and efficient personal transportation. To provide personal comfort, the passenger vehicles may be designed for easy passenger ingress and egress, and may have comfortable seating arrangements with generous legroom and headroom. The passenger vehicles may also have a sophisticated suspension system that provides a comfortable ride and a dynamically adjustable parameters to help keep the passenger vehicle level, positioned at a convenient height, and to ensure a comfortable ride throughout a range of variable load weights.

Conventional personal automobiles are designed for operation primarily in only one direction. This is due in part to the fact that drivers are oriented forwards, and operating in reverse for long distances is generally not safe or necessary. However, in autonomous passenger vehicles, where humans are not directly controlling the operation of the passenger vehicle in real-time, it may be advantageous for a passenger vehicle to be able to operate bidirectionally. For example, the passenger vehicles in an autonomous transportation system as described herein may be substantially symmetrical, such that the passenger vehicles lack a visually or mechanically distinct front or back. Further, the wheels may be controlled sufficiently independently so that the passenger vehicle may operate substantially identically no matter which end of the passenger vehicle is facing the direction of travel.

This symmetrical design provides several advantages. For example, the passenger vehicle may be able to maneuver in smaller spaces by potentially eliminating the need to make maneuvers to re-orient the passenger vehicles so that they are facing "forward" before initiating a journey.

In further examples, passenger vehicles in an autonomous transportation system, such as described herein, may be contemporaneously operated in groups, generally referred to as "platoons" to increase efficiency (e.g., reduced air resistance and drag by drafting), reduce roadway congestion, increased safety due to decreased collisions, and so on. More specifically, in these examples the distance between passenger vehicles (e.g., the "headway" between passenger vehicles) can be minimized to increase the route capacity of the autonomous transportation system.

In these examples, the various passenger vehicles in a platoon may preferably communicate with one another to coordinate one or more actions of the platoon or an individual passenger vehicle. For example, it may be desirable for a leading passenger vehicle of a platoon to communicate to following passenger vehicles of that platoon that an accident has been detected or reported ahead, and that the platoon may need to change course or decelerate.

More generally, the passenger vehicles in these examples include one or more wireless vehicle-to-vehicle communications systems that allow the passenger vehicles to inform one another of operational parameters such as braking status, acceleration status, upcoming maneuvers (e.g., right turn, left turn, and so on), number or type of payload (e.g., passengers or goods), and so on. The passenger vehicles may also include wireless communications systems to facilitate communication with a central operations system that has supervisory command and control authority over the autonomous transportation system.

Further to the foregoing, many embodiments described herein reference electronic devices, and in particular passenger vehicles, configured to transact (e.g., transmit and receive) data with other electronic devices (e.g., other passenger vehicles, infrastructure or roadway devices, public transportation systems, traffic alert systems, weather alert systems, law enforcement alert systems, and so on) via free-space optical communication.

As used herein, the phrase "free-space optical communication" refers to the delivery of digital and/or analog information or data by selectively modulating and/or otherwise controlling the spatial distribution (e.g., pattern), amplitude, frequency, phase, polarization, angle, pulse width, duty cycle, and/or any other suitable characteristic of visible or traditionally non-visible light propagating through a medium (e.g., gases, liquids, vacuum, and so on). A system that facilitates free-space optical communication between passenger vehicles from at least one "source vehicle" (or source device) to at least one "endpoint vehicle" (or endpoint device) is referred to herein as a "passenger vehicle optical communication system."

Any stationary or portable electronic device can be either (or both) a source vehicle or device or an endpoint vehicle or device of a passenger vehicle optical communication system, such as described herein. For example, a source device of an autonomous transportation system may be a stationary infrastructure device that communicates speed limit information to passing passenger vehicles. In other cases, an endpoint device may be a stationary device positioned on a roadway and configured receive information from a passing source vehicle.

For simplicity and description, however, the embodiments that follow reference a source vehicle and an endpoint vehicle operating in a platoon formation in which one of the two vehicles is "leading" a "following" vehicle. The leading vehicle may be the source vehicle (e.g., configured to transmit information to the following vehicle) or the leading vehicle may be the endpoint vehicle (e.g., configured to receive information to the following vehicle). It may be appreciated that any suitable number of passenger vehicles, such as describe herein, can be included in or associated with a platoon formation and, as such, any number of passenger vehicles can be operated as, and/or in a mode associated with, a source vehicle or and endpoint vehicle, such as described herein.

In some embodiments, a passenger vehicle optical communication system is "directional" in that light emitted from the source vehicle propagates through a medium (e.g., air) separating the source vehicle and the endpoint vehicle along a substantially line-of-sight path.

As may be appreciated, a directional passenger vehicle optical communication system can facilitate increased data transfer rates, increased data transfer privacy, increased data transfer security, and increased interference immunity relative to conventional device-to-device data communication protocols, such as Wi-Fi, Near-Field Communications, cellular communications, or Bluetooth.

As noted above, a directional passenger vehicle optical communication system, such as described herein, includes at least a source vehicle and at least one endpoint vehicle. The source vehicle includes at least one light source and the endpoint vehicle includes at least one photosensitive element.

As a result of this construction, when a light source of a source vehicle and a photosensitive element of an endpoint vehicle are substantially collimated (e.g., generally aligned along a line-of-sight path), the source vehicle can communicate digital and/or analog information to the endpoint vehicle by modulating light emitted from the light source.

In this configuration and alignment, the source vehicle and the endpoint vehicle can be described as "optically coupled" or, more generally, "communicably coupled." It may be appreciated that, in many embodiments, optically coupled passenger vehicles can each include one or more light sources and one or more photosensitive elements to enable multi-channel and/or two-way communication and/or multi-device communication (e.g., three or more devices optically coupled).

However, for simplicity of description, the embodiments that follow reference a directional passenger vehicle optical communication system configured for one-way, single-channel data transfer from a source vehicle to an endpoint vehicle.

In this example, the light source of the source vehicle can be any suitable electrical or electronic light source or combination of light sources, including both multipart and solid-state light sources. In many embodiments, a light source of a source vehicle is a semiconductor light source such as, but not limited to: a laser light source; a light-emitting diode; an organic light-emitting diode; a resonant-cavity light-emitting diode; a superluminescent light-emitting diode; a broad-area laser diode; an infrared band laser; an ultraviolet band laser; and so on.

In one embodiment, the light source of the source vehicle is a two-dimensional array of independently-controlled (e.g., addressed) light sources, such as light-emitting diodes (or matrixes of light-emitting diodes) or VCSEL light sources. As a result of this construction, the source vehicle can be configured to project a series or sequence of patterns—also referred to as frames—to illuminate a field of view extending from the source vehicle into free space. Each pattern two-dimensional projected by the source vehicle can encode digital information. In this manner, the source vehicle can transmit a large quantity of digital information to the endpoint vehicle by transmitting a sequence of patterns.

It may be appreciated that, any suitable pattern can be transmitted by a source vehicle of a directional passenger vehicle optical communication system, such as described herein. Examples include, but are not limited to: barcodes; quick-read codes; matrix codes; and so on.

In some examples, a pattern projected by a source vehicle (that, as noted above, may be one of a set of frames of a sequence of patterns) can be monochromatic. In other cases, a pattern projected by a source vehicle can be polychromatic. In still further cases, a portion of a pattern projected by a source vehicle can established by alternatingly projecting two or more separate colors, and/or visible or non-visible light, in rapid sequence. It may be appreciated that by using this technique, the pattern projected by the source vehicle can be "hidden" within an image that otherwise appears static to an observer. For example, the colors red and blue can be rapidly alternated such that an observer perceives the color purple. In this manner, a pattern constructed from specific colors (e.g., red and blue), such a as a two-dimensional matrix code, can be flashed in rapid sequence with a negative image of the same two-dimensional code; the result may be perceived by an observer as a single static image.

In some embodiments, the light source of a source vehicle can be optically coupled to one or more passive or active optical structures that direct and/or focus light emitted from the light source in a particular direction or manner. Example optical structures can include, but may not be limited to: waveguides; optical fibers; reflectors; lenses; microlenses; beamforming and/or beam-directing lenses or lens structures; beam splitters; beam collimators; polarizers; movable lenses; color filters; cut filters; beam expanders; beam divergers; and so on.

For simplicity of description and illustration, the embodiments that follow reference a source vehicle that includes a light source implemented as a two-dimensional array of independently-addressable light-emitting elements that are each configured to emit light in a traditionally non-visible light band, such as infrared. In these examples, the light source of the source vehicle is configured to project a sequence of monochromatic patterns toward the endpoint vehicle, each pattern of the sequence of monochromatic patterns encoding digital information. In these embodiments, each pattern can include one or more fiducial markers, but this may not be required.

It may be appreciated that these example embodiments are not exhaustive; in other examples, other patterns may be projected by a light source of a source vehicle such as, but not limited to: polychromatic patterns; patterns including visible and traditionally non-visible light; patterns embedded in an advertisement or signage; and so on.

The photosensitive element of an endpoint vehicle, such as described herein, can be any suitable photosensitive element or combination of elements, including both multipart and solid-state photosensitive elements operated in either photovoltaic mode (e.g., not reverse biased) or photoconductive mode (e.g., reverse biased). Example photosensitive elements include, but are not limited to: semiconductor photodiodes; semiconductor photodetectors; avalanche diodes; charge-coupled devices; and so on. Further, it may be appreciated that the size and shape of a photosensitive element can vary from embodiment to embodiment. In some cases, a "photosensitive area" of a photosensitive element can take a circular shape, whereas in other cases, the photosensitive area can take another shape (e.g., square, rectangular, octagonal, irregular, polygonal, and so on).

Further, some embodiments can include more than one photosensitive area. For example, a first photosensitive area can be inset within a second photosensitive area of the same photosensitive element. In these examples, different photosensitive areas may be formed from different materials, or material combinations, and/or may have different photosensitivity or electrical characteristics (e.g., rise time, fall time, reverse bias, dark current, and so on). In further examples, a photosensitive element can be constructed such that its photosensitive area exhibits particular electrical properties, at least in part, as a result of the materials, geometry, or dimensions of the photosensitive area. For example, it may be appreciated that different semiconductor materials (e.g., silicon, germanium, indium-gallium arsenide, gallium phosphide, and so on) may exhibit different electrical properties (e.g., rise time, fall time, dark current, and so on) in response to stimulation by different spectral ranges and/or amplitudes of light. Similarly, different photosensitive area geometries and/or dimensions may result in different electrical properties. For example, smaller photosensitive areas may be associated with faster rise times and faster fall times.

In further examples and embodiments, the photosensitive element of the endpoint vehicle may include an array of independent photosensitive areas. For example, the endpoint vehicle can include one or more digital cameras. In many embodiments, the digital camera can be a complimentary metal-oxide semiconductor camera or a charge-coupled device camera; a person of skill in the art may appreciate that a number of camera technologies may be suitable.

In many examples, the digital camera(s) of the endpoint vehicle are event-driven digital cameras configured to output image information corresponding only to detected changes in light (e.g., a change in light received at a particular pixel exceeds a selected threshold). This is merely one example. For simplicity of description, many embodiments that follow reference an event-driven digital camera, but it may be appreciated that this is merely one example and that other cameras, imaging components, and/or photosensitive elements or arrays of photosensitive elements can be included or incorporated in other embodiments.

As with the light source of the source vehicle, in some embodiments, the photosensitive element of an endpoint vehicle can be optically coupled to one or more passive or active optical structures that redirect and/or focus light onto the photosensitive area of the photosensitive element. Example optical structures can include, but may not be limited to: waveguides; optical fibers; reflectors; lenses; microlenses; beamforming and/or beam-directing lenses or lens structures; beam collimators; polarizers; movable lenses; color filters; cut filters; beam concentrators; and so on.

For simplicity of description and illustration, the embodiments that follow reference an endpoint vehicle including at least one digital camera including an array of photodiodes or other photosensitive elements. In these embodiments, the photosensitive elements of the digital camera are each responsive to light in the spectral range emitted by the source vehicle.

As noted above, a directional passenger vehicle optical communication system, such as described herein, preferably operates in the collimated regime in which the source vehicle and the endpoint vehicle are aligned (e.g., in a row, convoy, or train formation) such that light emitted from the source vehicle is visible to the digital camera of the endpoint vehicle.

To account for positional and/or angular offset(s) between the source vehicle and the endpoint vehicle—or, more generally, between the light source of the source vehicle and the digital camera of the endpoint vehicle—many embodiments described herein reference de-skewing and/or other image processing techniques that may be performed by an image processor of the endpoint vehicle. For example, in some embodiments, the image processor of the endpoint vehicle can be configured to detect the presence, orientation, and/or location of one or more fiducials (or other markers or features, such as edges) in one or more patterns transmitted by the light source of the source vehicle. Based, at least in part, on an apparent distortion or skewing of the fiducial, the image processor can determine a suitable correction operation to perform to de-skew and normalize the image received by the digital camera of the endpoint device. In further examples, the image processor can calculate one or more properties of the endpoint vehicle or the source vehicle based on the determine correction operation. For example, if the image processor determines that an image received from the digital camera of the endpoint vehicle is distorted, the image processor can determine a relative angular offset and/or a distance between the source vehicle and endpoint vehicle based on the correction operation required to counteract the apparent distortion.

In still further examples, a directional passenger vehicle optical communication system can be configured to dynamically change and/or adjust its own bandwidth (e.g., change resolution of one or more patterns transmitted by the source vehicle) to maintain communication between vehicles, despite the presence of environmental interference, such as fog, rain, pollution, and so on.

These foregoing and other embodiments are discussed below with reference to FIGS. 1A-10. However, those skilled in the art will readily appreciate that the detailed description given herein with respect to these figures is for explanatory purposes only and should not be construed as limiting.

Figure 1B:
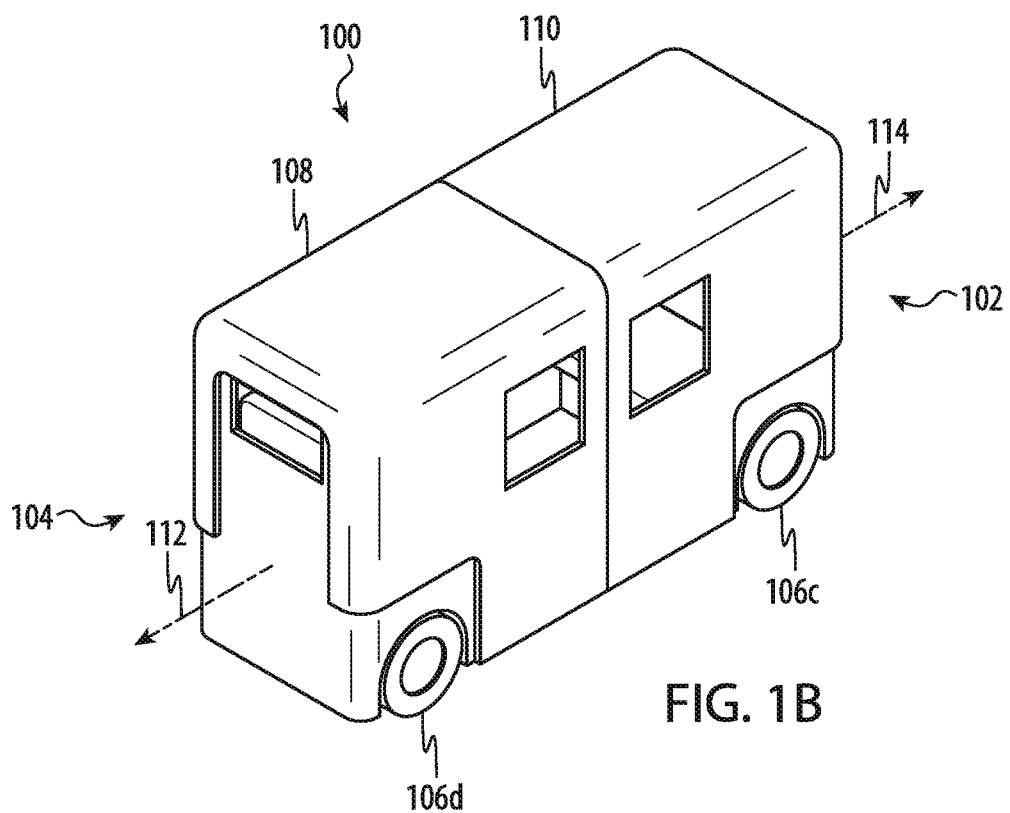

FIGS. 1A and 1B are isometric views of an example passenger vehicle 100 that may be used in an autonomous transportation system as described herein. FIGS. 1A-1B illustrate the symmetry and bidirectionality of the passenger vehicle 100. In particular, the passenger vehicle 100 defines a first end 102, shown in the forefront in FIG. 1A, and a second end 104, shown in the forefront in FIG. 1B. As shown, the first and second ends 102, 104 are substantially identical. Moreover, the passenger vehicle 100 may be configured so that it can be driven with either end facing the direction of travel. For example, when the passenger vehicle 100 is travelling in the direction indicated by arrow 114, the first end 102 is the leading end of the passenger vehicle 100, while when the passenger vehicle 100 is traveling in the direction indicated by arrow 112, the second end 104 is the leading end of the passenger vehicle 100.

The passenger vehicle 100 may also include wheels 106 (e.g., 106a-106d). The wheels 106 may be paired according to their proximity to an end of the passenger vehicle. Thus, wheels 106a, 106c may be positioned proximate the first end 102 of the passenger vehicle and may be referred to as a first pair of wheels 106, and the wheels 106b, 106d may be positioned proximate the second end 104 of the passenger vehicle and may be referred to as a second pair of wheels 106.

Each pair of wheels may be driven by at least one motor (e.g., an electric motor), and each pair of wheels may be able to steer the passenger vehicle. Because each pair of wheels is capable of turning to steer the passenger vehicle, the passenger vehicle may have similar driving and handling characteristics regardless of the direction of travel. In some cases, the passenger vehicle may be operated in a two-wheel steering mode, in which only one pair of wheels steers the passenger vehicle 100 at a given time. In such cases, the particular pair of wheels that steers the passenger vehicle 100 may change when the direction of travel changes.

The passenger vehicle 100 may also include doors 108, 110 that open to allow passengers and other payloads (e.g., packages, luggage, freight) to be placed inside the passenger vehicle 100. The doors 108, 110, which are described in greater detail herein, may extend over the top of the passenger vehicle such that they each define two opposite side segments. For example, each door defines a side segment on a first side of the passenger vehicle and another side segment on a second, opposite side of the passenger vehicle.

The doors also each define a roof segment that extends between the side segments and defines part of the roof (or top side) of the passenger vehicle. In some cases, the doors 108, 110 resemble an inverted "U" in cross-section. The side segments and the roof segment of the doors may be formed as a rigid structural unit, such that all of the components of the door (e.g., the side segments and the roof segment) move in concert with one another.

Figure 2A:
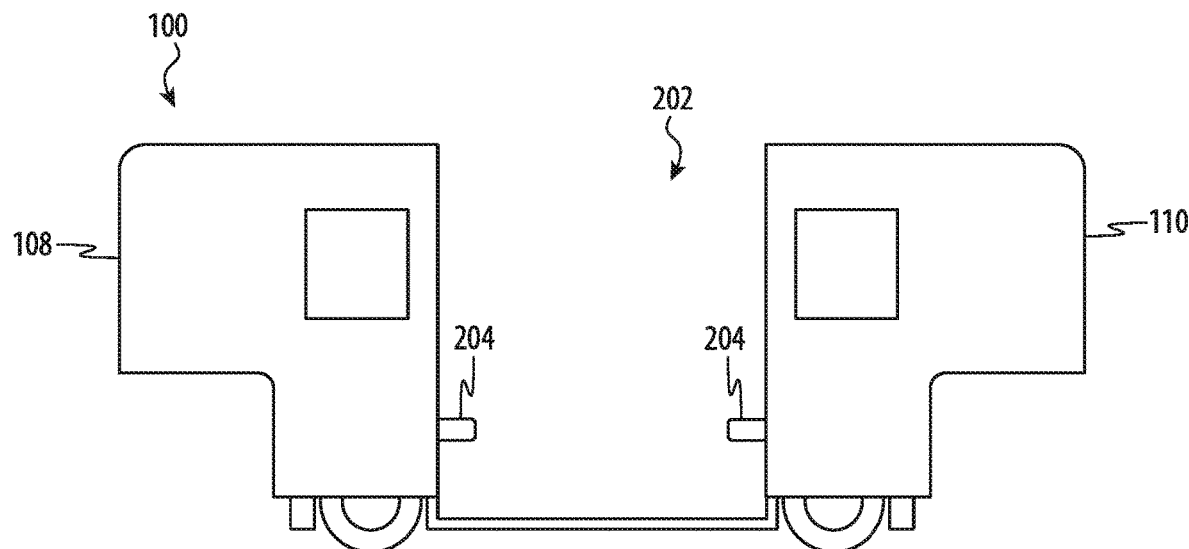
FIGS. 2A-2B depict the passenger vehicle of FIGS. 1A-1B with its doors open.
Figure 2B:
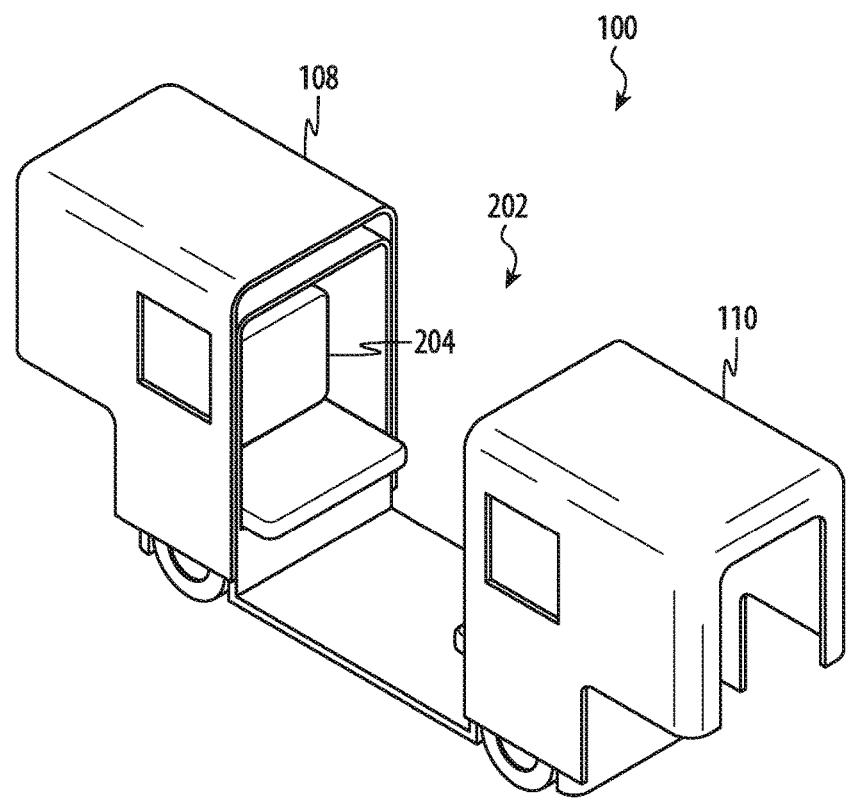

FIGS. 2A and 2B are side and isometric views of the passenger vehicle 100 with the doors 108, 110 in an open state. Because the doors 108, 110 each define two opposite side segments and a roof segment, an uninterrupted internal space 202 may be revealed when the doors 108, 110 are opened. This may allow for unimpeded ingress and egress into the passenger vehicle 100 by passengers on either side of the passenger vehicle 100.

The passenger vehicle 100 may also include seats 204, which may be positioned at opposite ends of the passenger vehicle 100 and may be facing one another. As shown the passenger vehicle includes two seats, though other numbers of seats and other arrangements of seats are also possible (e.g., zero seats, one seat, three seats, and so on). In some cases, the seats 204 may be removed, collapsed, or stowed so that wheelchairs, strollers, bicycles, or luggage may be more easily placed in the passenger vehicle 100.

Figure 3A:
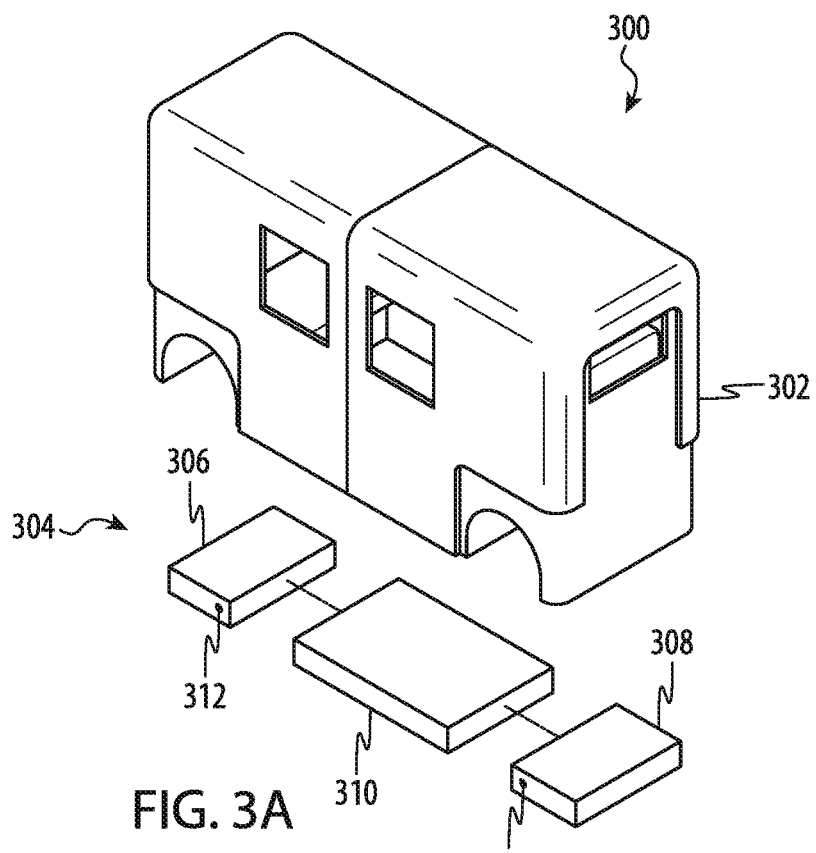
FIG. 3A depicts a partial exploded view of an example configuration of a passenger vehicle.
Figure 3B:
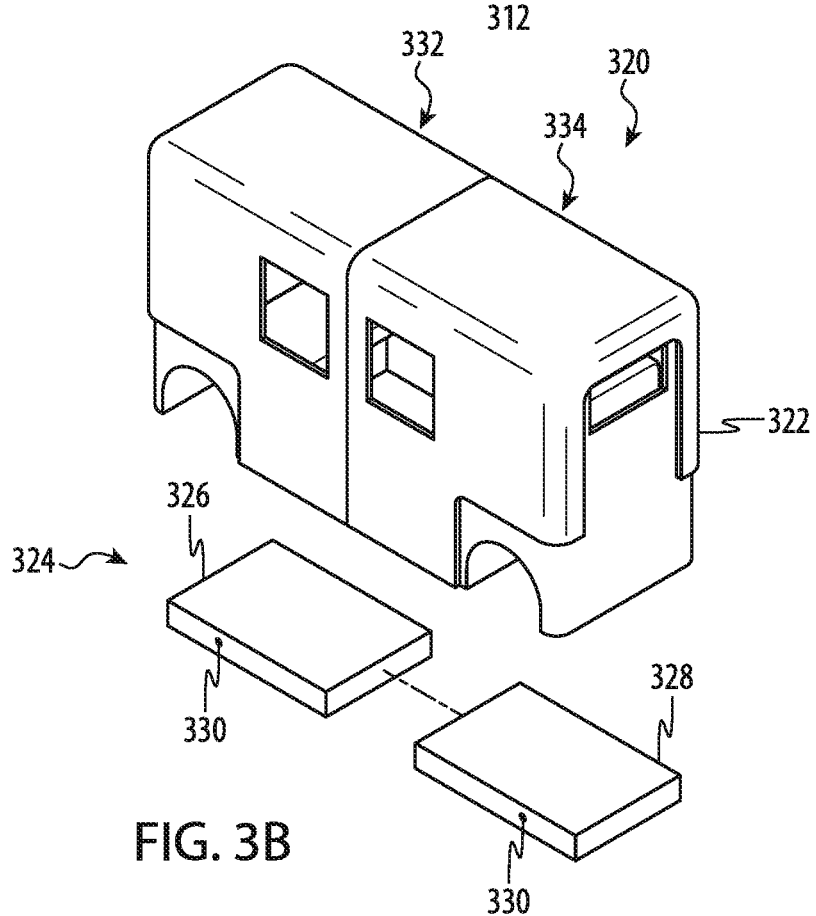
FIG. 3B depicts a partial exploded view of another example configuration of a passenger vehicle.

Passenger vehicles for use in an autonomous transportation system as described herein, such as the passenger vehicle 100, may be designed for safe and comfortable operation, as well as for ease of manufacture and maintenance. To achieve these advantages, the passenger vehicles may be designed to have a frame structure that includes many of the structural and operational components of the passenger vehicle (e.g., the motor, suspension, batteries, and so on) and that is positioned low to the ground. A body structure may be attached or secured to the frame structure. FIGS. 3A-3B illustrate partial exploded views of passenger vehicles, which may be embodiments of the passenger vehicle 100, showing example configurations of a frame structure and body structure.

The low position of the frame structure combined with the relatively light-weight body structure produces a passenger vehicle with a very low center of gravity, which increases the safety and handling of the passenger vehicle. For example, a low center of gravity reduces the rollover risk of the passenger vehicle when the passenger vehicle encounters slanted road surfaces, wind loading, sharp turns, or the like, and also reduces body roll of the passenger vehicle during turning or other maneuvers. Further, by positioning many of the operational components of the passenger vehicle, such as motors, batteries, control systems, sensors (e.g., sensors that detect road-mounted magnets or other markers), and the like, on the frame structure, manufacture and repair may be simplified.

FIG. 3A is a partial exploded view of a passenger vehicle 300, which may be an embodiment of the passenger vehicle 100. Details of the passenger vehicle 100 may be equally applicable to the passenger vehicle 300, and will not be repeated here. The passenger vehicle 300 may include a body structure 302, which may include doors (e.g., the doors 108, 110, described above) and other body components, and a frame structure 304 to which the body structure 302 is attached.

The frame structure 304 may be formed by coupling together several structural components. For example, FIG. 3A shows a frame structure 304 that includes a base module 310 and first and second wheel modules 306, 308. The wheel modules 306, 308 may be the same or similar to one another, and may in fact be interchangeable with one another. In this way, assembly and repair may be simplified as wheel modules may be replaced and/or swapped easily and quickly, and fewer unique replacement parts may be necessary to produce and/or store.

The wheel modules 306, 308 may include drive, suspension, and steering components of the passenger vehicle. For example, the wheel modules may include wheel suspension systems (which may define or include wheel mounts or axles, illustrated in FIG. 3A as points 312), steering systems, drive motors, and optionally motor controllers. The drive motors may include one or more drive motors that drive the wheels, either independently or in concert with one another. The drive motors may receive power from a power source (e.g., battery) that is mounted on the base module 310. Motor controllers for the drive motors may also be mounted on the wheel modules 306, 308, or they may be mounted on the base module 310.

The suspension systems may be any suitable type of suspension system. In some cases, the suspension systems include independent suspension systems for each wheel. For example, the suspension systems may be double-wishbone torsion-bar suspension systems. The suspension systems may also be dynamically adjustable, such as to control the ride height, suspension preload, damping, or other suspension parameters while the passenger vehicle is stationary or while it is moving. Other suspension systems are also contemplated, such as swing axle suspension, sliding pillar suspension, MacPherson strut suspension, or the like. Moreover, spring and damping functions may be provided by any suitable component or system, such as coil springs, leaf springs, pneumatic springs, hydropneumatic springs, magneto-rheological shock absorbers, and the like.

The wheel modules 306, 308 may also include steering systems that allow the wheels to be turned to steer the passenger vehicle. In some cases the wheels may be independently steerable, or they may be linked (e.g., via a steering rack) so that they always point in substantially the same direction during normal operation of the passenger vehicle. As noted above, because each pair of wheels is steerable, either wheel module 306, 308 may be the leading or trailing wheel module at a given time.

The base module 310 may include components such as batteries, motors and mechanisms for opening and closing the passenger vehicle's doors, control systems (including computers or other processing units), and the like. The wheel modules 306, 308 may be attached to the base module 310 in a secure manner, such as via bolts or other fasteners, interlocking structures, rivets, welds, or the like. In some cases, the wheel modules 306, 308 are removable from the base module 310 in a non-destructive manner (e.g., without having to cut weldments or metal or otherwise damage the structural material of the module) so that the modules may be replaced or disassembled from one another for ease of service or repair.

FIG. 3B is a partial exploded view of a passenger vehicle 320, which may be an embodiment of the passenger vehicle 100. Details of the passenger vehicle 100 may be equally applicable to the passenger vehicle 320, and will not be repeated here. The passenger vehicle 320 may include a body structure 322, which may include doors (e.g., the doors 108, 110, described above) and other body components, and a frame structure 324 to which the body structure 322 is attached.

Whereas the frame structure 304 in FIG. 3A included a base module and two wheel modules, the frame structure 324 in FIG. 3B includes two wheel modules 326, 328 and no separate base module. The wheel modules 326, 328 may include all of the components of the wheel modules 306, 308 in FIG. 3B, but may also include components that were coupled to or otherwise integrated with the base module 310. For example, each wheel module 326, 328 may include wheel suspension (which may include wheel mounts or axles, illustrated in FIG. 3B as points 330), steering systems, drive motors, and motor controllers.

The wheel modules 326, 328 may also include batteries, control systems (including computers or other processing units), motors and mechanisms for opening and closing the passenger vehicle's doors, and the like. In some cases, components of the wheel modules 326, 328 may be configured to be backup or redundant components. For example, each wheel module 326, 328 may include a control system that is capable of controlling all of the operations of the passenger vehicle, including controlling the components and mechanisms of its own wheel module as well as those of the other wheel module of the frame structure 324. Accordingly, if one control system malfunctions or fails, the other control system on the other wheel module may seamlessly assume operation of the passenger vehicle.

The wheel modules 326, 328 may be attached to one another in a secure manner, such as via bolts or other fasteners, interlocking structures, rivets, welds, or the like. In some cases, the wheel modules 326, 328 are removable from one another in a non-destructive manner (e.g., without having to cut weldments or metal or otherwise damage the structural material of the module) so that the modules may be replaced or disassembled from one another for ease of service or repair.

While the body structure 322 is shown in FIG. 3B as separate from the frame structure 324, other embodiments may integrate the body structure 322 with the frame structure 324. For example, the body structure 322 may have a first segment 332 and a second segment 334, which may be structurally coupled to the wheel modules 326, 328, respectively. In this way, structural components of the body structure 322 and the frame structure 324 that require or benefit from precise alignment may be assembled to a common substructure, thereby reducing misalignment between those components.

For example, as described herein, door mechanisms may include a four-bar linkage with one pivot positioned on the first body segment 332, and another pivot positioned on the wheel module 326 (e.g., the wheel module directly below that body segment). By building the first body segment 332 to the underlying wheel module 326, the alignment between these pivots may be more tightly controlled. Additionally, in many cases the alignment between the first and second segments 332, 334 of the body structure 322 may be less important than the alignment between a given segment of the body structure 322 and the underlying wheel module. Accordingly, integrating separate segments of the body structure 322 with separate wheel modules may improve the tolerances and alignment of the components of the passenger vehicle.

FIGS. 3A-3B illustrate example configurations of passenger vehicles and frame structures. Other configurations are also possible, however. Moreover, the frame structures and the body structures shown in FIGS. 3A-3B are intended more as schematic representations of these components, and these components may include other structures that are omitted from FIGS. 3A-3B for clarity. Moreover, additional structural connections and integrations may be made between the body structures and the frame structures than are explicitly represented in FIGS. 3A-3B. For example, components a door mechanism that open and close the doors of the body structures may be joined to both the doors and to the frame structures.

As noted above, passenger vehicles for use in an autonomous transportation system as described herein may be outfitted with doors that open to provide easy ingress and egress from the passenger vehicle. For example, the doors may open to reveal a large, roofless opening that provides access to the interior volume of the passenger vehicle. As described above, the doors may define portions of two opposite sides of the passenger vehicle, as well as a portion of the top of the passenger vehicle. In order to allow these doors to open in the manner shown and described with respect to FIGS. 2A-2B, the doors may be coupled to the frame and/or a body of the passenger vehicle by door mechanisms that are configured to move the doors between a closed position (as shown in FIG. 1A) and an open position (as shown in FIGS. 2A-2B). As described herein, the door mechanisms may include mechanical linkages, motors, gear systems, and the like.

Accordingly, generally and broadly in view of FIGS. 1A-3B, it is understood that a passenger vehicle, such as described herein, can be configured in a number of suitable ways, Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Figure 4A:
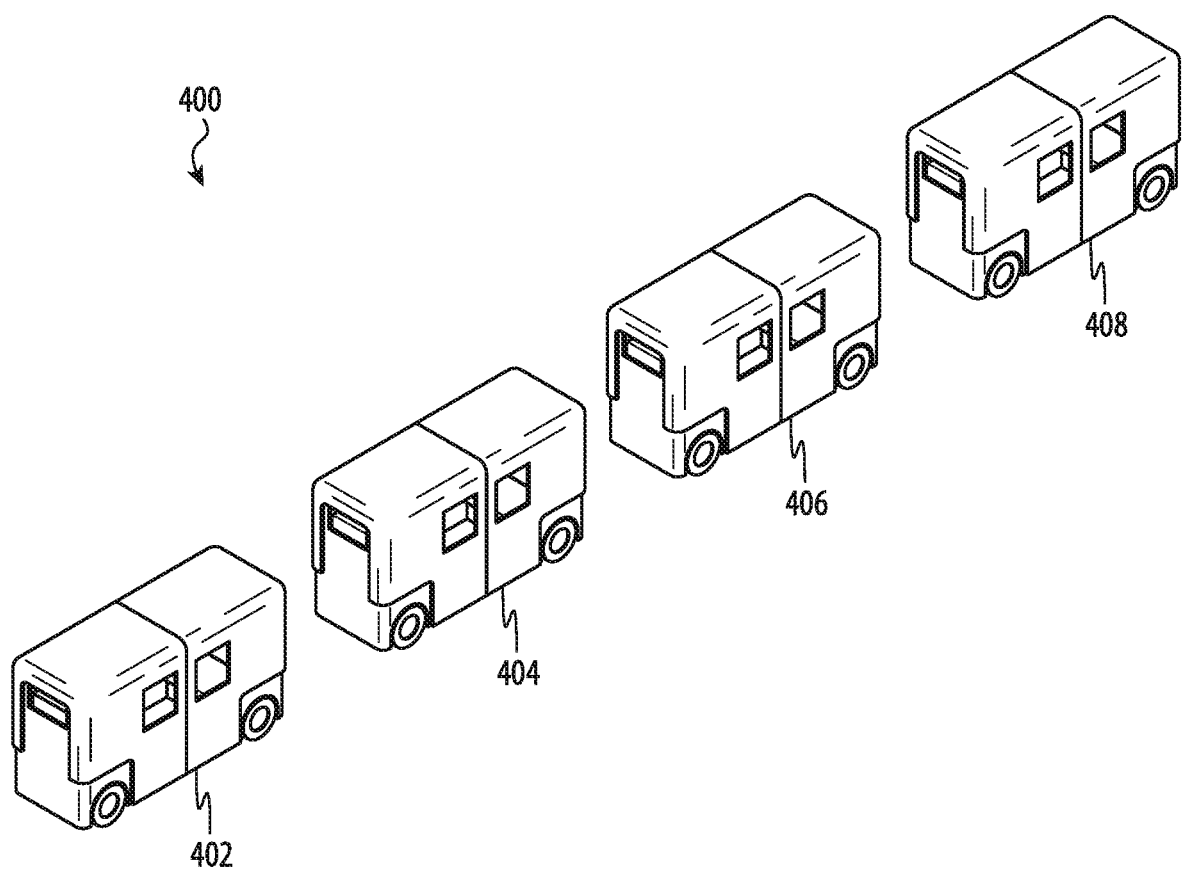
FIG. 4A depicts a set of passenger vehicles of an autonomous transportation system operating in a platoon formation.

For example, as noted above, in some embodiments, a number of passenger vehicles of an autonomous transportation system can traverse a roadway together. In many cases, the passenger vehicles can reduce the headway between each passenger vehicle in order to reduce drag, increase fuel/energy efficiency, and to reduce roadway congestion. FIG. 4A depicts a set of passenger vehicles operating in a platoon formation facilitated, at least in part, by a passenger vehicle optical communication system 400, such as described herein. Specifically, the platoon includes four vehicles—identified as the passenger vehicles 402, 404, 406, and 408—that are depicted in a row or line.

As noted with respect to other embodiments described herein, the passenger vehicles 402, 404, 406, and 408 are configured to exchange information across an optical communication link referred to herein as a "passenger vehicle optical communication system."

Figure 4B:
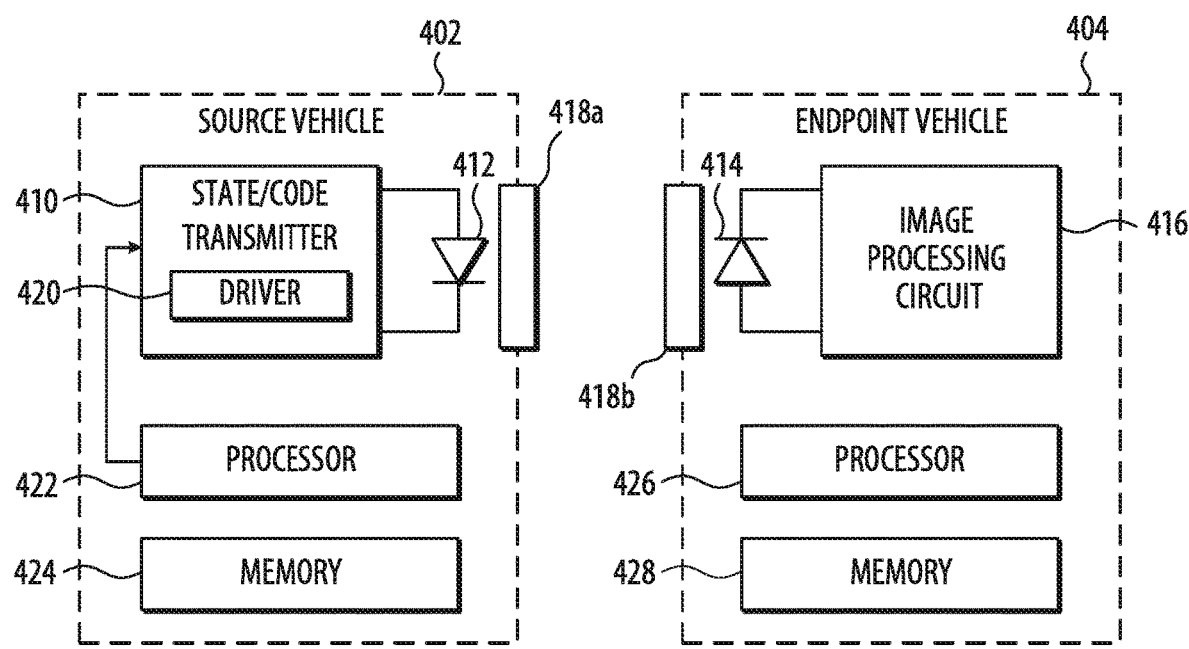
FIG. 4B depicts a simplified system diagram of a passenger vehicle optical communication system, such as described herein.

FIG. 4B depicts a simplified system diagram of a passenger vehicle optical communication system 400, that may be used with the autonomous transportation system of FIG. 4A. In this example embodiment, for simplicity of description, two vehicles are shown—the passenger vehicle 402 and the passenger vehicle 404. As noted with respect to other embodiments described herein, it may be appreciated that the one-way optical communication depicted in FIG. 4B is merely one example presented for simplicity of description; it may be appreciated that in many embodiments, passenger vehicles may be operated as both a source device and an endpoint device. In this embodiment, however, these passenger vehicles are referred to as the source vehicle 402 and the endpoint vehicle 404. The source vehicle 402 is configured to transmit information, data, states, roadway status, law enforcement instructions, instructions, or any other suitable data or information to the endpoint vehicle 404.

As noted with respect to other embodiments described herein, the source vehicle 402 communicates with the endpoint vehicle 404 by projecting a sequence of patterns in the form of one or two dimensional codes (e.g., bar codes, matrix codes, and so on). In many embodiments, the source vehicle 402 is configured to stream data and or information to the endpoint vehicle 404, although this may not be required and in other embodiments, the source vehicle 402 can be configured to transmit data and/or information to the endpoint vehicle 404 in bursts, packets, frames, or any other suitable manner. In many cases, the source vehicle 402 is configured to transmit one or more header frames, packets, or bits to inform the endpoint vehicle 404 to expect a message. In some cases, the information transmitted from the source vehicle 402 to the endpoint vehicle 404 can also include an identifier, such as a unique address, that identifies the source vehicle 402 to the endpoint vehicle 404. Suitable identifiers include, but are not limited to: indexes; media access control addresses; internet protocol addresses; universally unique identifiers; and so on.

For simplicity of description, many embodiments that follow reference a source vehicle configured to communicate with an endpoint vehicle according to a streaming communication protocol. It may be appreciated, however, that any suitable encoding, encryption, or data transfer techniques can be used including one-dimensional and two-dimensional patterns that quantize data according to a binary or n-ary encoding schema.

The source vehicle 402 includes a state/code transmitter 410 including an addressable light source array 412 that projects light in a sequence of patterns toward an event-driven digital camera 414 in the endpoint vehicle 404.

The event-driven digital camera 414 in the endpoint vehicle 404 is communicably coupled to an image processing circuit 416 in the endpoint vehicle 404 so that changes in light detected and reported by the event-driven digital camera 414 can be converted into a set or array of digital values or a series of digital values suitable for further processing and/or analysis by the image processing circuit 416.

In some embodiments, the image processing circuit 416 of the endpoint vehicle 404 is or includes a multi-bit analog-to-digital converter configured to quantize a level of voltage output from a photosensitive element of the event-driven digital camera 414 into a series or set of digitally represented values.

In other cases, the image processing circuit 416 includes a single-bit analog-to-digital converter or a limiting amplifier configured to generate a sequence of voltages that correspond to serial digital binary data (e.g., ones and zeros). In other words, the image processing circuit 416 can include a high-speed switching element (e.g., diode, transistor, and so) in order to quantize a voltage output from the event-driven digital camera 414 as either a binary one or a binary zero. In still other examples, the image processing circuit 416 can be coupled to a buffer and/or shift register configured to convert serial information received from the source vehicle 402 into a parallel data that may be conveyed to and/or processed by other elements or components of the endpoint vehicle 404.

In many embodiments, the image processing circuit 416 of the endpoint vehicle 404 is configured to de-skew otherwise correct for angular and positional offsets between the source vehicle 402 and the endpoint vehicle 404. For example, if the source vehicle 402 has initiated a turn, the source vehicle 402 may be angularly offset with respect to the endpoint vehicle 404 and, as such, an image received by the event-driven digital camera 414 may be skewed or otherwise deformed.

In still further embodiments, the image processing circuit 416 can be configured to quantify one or more properties of an image correction operation that it performs in order to infer information describing a relative positional or angular relationship between the endpoint vehicle 404 and the source vehicle 402. For example, if the image processing circuit 416 determines that a two-dimensional pattern projected by the state/code transmitter 410 of the source vehicle 402 is skewed or angled in a particular manner or to a certain degree, the image processing circuit 416 may determine an angle of offset between and/or a distance separating the source vehicle 402 and the endpoint vehicle 404.

In some embodiments, the source vehicle 402 can also include other components, such as a passive or active optical structure (e.g., one or more lenses, filters, protective layers, and so on), identified as the optical structure 418a, that may be configured to adjust one or more optical characteristics of one or more patterns of the projected sequence (e.g., focus, direction, angle, divergence, color, polarization, and so on) as light exits the source vehicle 402.

For example, in one embodiment, the optical structure 418a can be configured to color light emitted from the state/code transmitter 410 to a particular color. In another example, the optical structure 418a can be configured to reorient light emitted from the state/code transmitter 410 to align with a particular axis or plane.

Similar to the source vehicle 402 described above, the endpoint vehicle 404 can also optionally include an optical structure 418b to adjust one or more characteristics of light before the such light is received by the event-driven digital camera 414 and, in turn, the image processing circuit 416.

In typical embodiments, the state/code transmitter 410 of the source vehicle 402 includes a drive circuit 420, coupled to the addressable light source array 412. The drive circuit 420 can be any suitable analog or digital circuit and/or purpose-configured processor, or combination thereof, configured to generate direct current and/or alternating current signals suitable to drive one or more light emitting elements of the addressable light source array 412, or a portion thereof, of the state/code transmitter 410 to emit light according to a particular pattern or frame. The drive circuit 420 can also be configured to drive the addressable light source array 412 to produce one or more header frames before projecting a sequence to indicate to an endpoint device to prepare to receive a projected sequence of patterns or any other optical communication from the source vehicle 402.

In some examples, the drive circuit 420 of the state/code transmitter 410 of the source vehicle 402 is configured to control a level of current circulated through one or more of the light sources of the addressable light source array 412 of the state/code transmitter 410, although this may not be required; other embodiments may control a voltage applied across one or more light sources of the addressable light source array 412 of the state/code transmitter 410. It may be appreciate that the drive circuit 420 can apply any suitable current or voltage waveform to cause the state/code transmitter 410 to emit light or patterns of light in any suitable manner and with any suitable characteristic(s) (e.g., pulse width, duty cycle, color, frequency, amplitude, spectral content, and so on). As noted with respect to other embodiments described herein, light emitted from the addressable light source array 412 of the state/code transmitter 410 may be monochromatic or polychromatic.

The source vehicle 402 can also include other components, including, without limitation, a processor 422, a memory 424, and so on. The processor 422 of the source vehicle 402 can be configured to access and execute instructions stored in the memory 424 in order to instantiate any number of suitable classes, objects, virtual machines, threads, pipelines, and/or routines to perform, monitor, and/or coordinate one or more operations of the source vehicle 402.

Further, the processor 422 can be communicably coupled—either directly (e.g., via general-purpose input/output pins) or indirectly (e.g., via an intermediary circuit or integrated circuit)—to other components of the source vehicle 402 (e.g., vehicle control systems, navigation systems, door control systems, emergency systems, and so on). In this manner, the processor 422 can participate in and/or coordinate one or more operations of one or more of the various hardware components of the source vehicle 402. For example, the processor 422 may be configured to perform, coordinate, or monitor one or more operations of the addressable light source array 412 and/or the state/code transmitter 410.

Similar to the source vehicle 402 described above, the endpoint vehicle 404 can also include a processor 426, a memory 428, and so on, each of which may be communicably coupled to the image processing circuit 416. Similar to the processor 422 of the source vehicle 402 described above, in many configurations, the processor 426 of the endpoint vehicle 404 can be configured to access and execute instructions stored in the memory 428 in order to instantiate any number of suitable classes, objects, virtual machines, threads, pipelines, and/or routines to perform, monitor, and/or coordinate one or more operations of the endpoint vehicle 404. Further, the processor 426 can be communicably coupled—either directly (e.g., via general-purpose input/output pins) or indirectly (e.g., via an intermediary circuit or integrated circuit)—to various hardware components of the endpoint vehicle 404. For example, the processor 426 may be configured to perform, coordinate, or monitor one or more operations of the event-driven digital camera 414.

In this manner, and as a result of this construction, the endpoint vehicle 404 can receive digital information in the form of patterns and sequences of patterns projected from the source vehicle 402, via the optical communication link established between the state/code transmitter 410 of the source vehicle 402 and the event-driven digital camera 414 of the endpoint device 402.

Figure 5A:
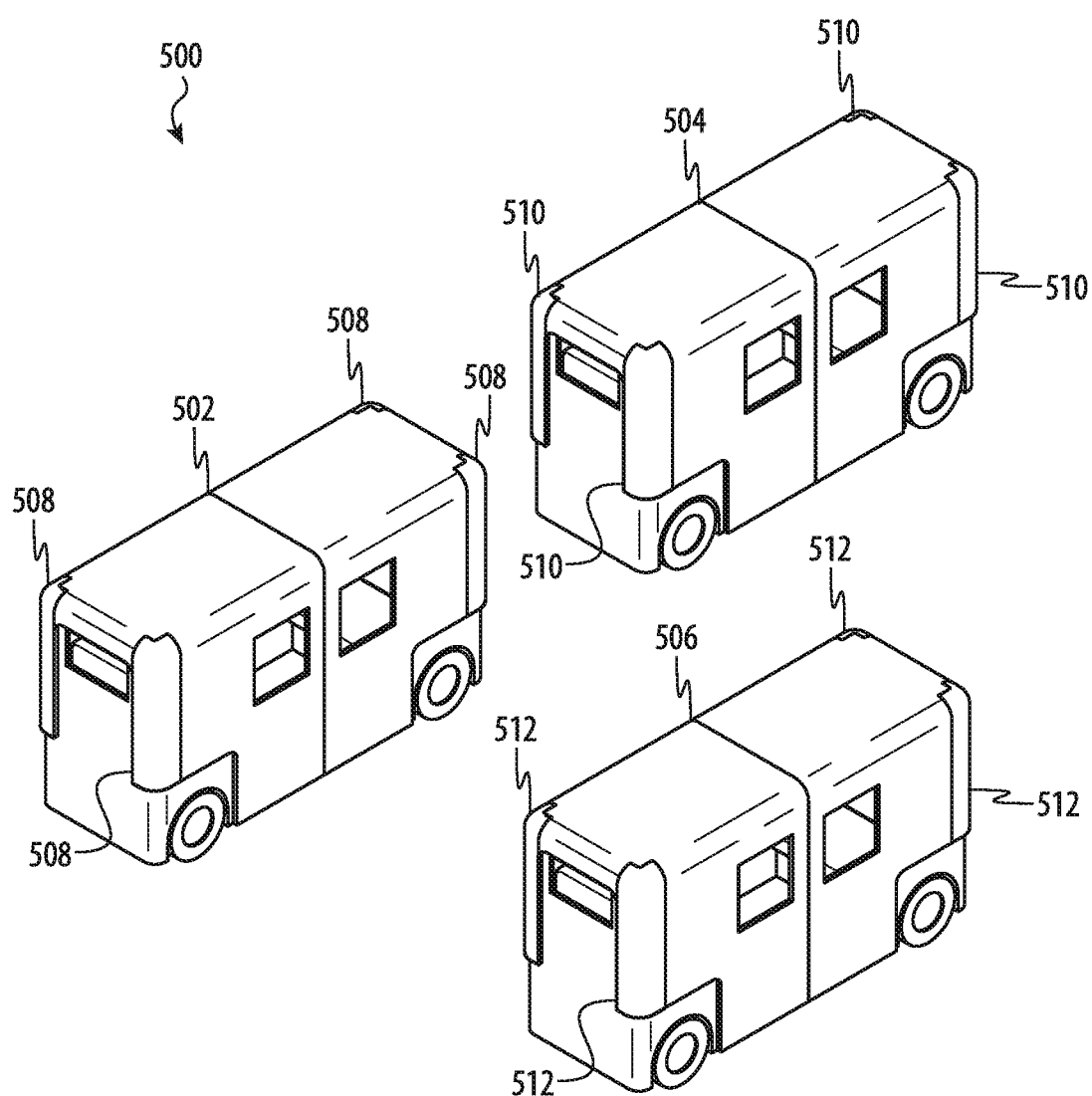
FIG. 5A depicts an example of a passenger vehicle optical communication system in which a source vehicle transmits state (or other) information to one or more endpoint vehicles by transmitting a sequence of one-dimensional patterns from a light source.

Generally and broadly, FIGS. 5A-5C depict an example passenger vehicle optical communication system in which information is transmitted and received by and between passenger vehicles by selectively modulating and/or otherwise controlling a one-dimensional spatial distribution (e.g., linear pattern), amplitude, frequency, phase, polarization, angle, pulse width, duty cycle, and/or any other suitable characteristic of visible or traditionally non-visible light emitted from a light emitting region of a source vehicle and that may be detected by a digital camera of an endpoint vehicle.

More specifically, in these embodiments, a passenger vehicle (a source vehicle) includes an array of independently-controllable lights arranged in a linear pattern. In some cases, the passenger vehicle includes a vertically-oriented array of independently-controllable light-emitting elements disposed at each of four corners of the passenger vehicle. In order to convey information, the array of independently-controllable lights arranged in a linear pattern can be selectively illuminated (or not illuminated). For example, if the array of independently-controllable lights arranged in a linear pattern includes four light-emitting diodes, a binary 3 can be communicated by illuminating two of the four light-emitting diodes. A person of skill in the art will understand that this is merely one example; any suitable encoding or illumination pattern can be used to convey digital information from the source vehicle to the endpoint vehicle.

For example, FIG. 5A depicts a passenger vehicle optical communication system 500 optically coupling a number of passenger vehicles, including a source vehicle 502 and an endpoint vehicle 504 that are aligned in a platoon formation. In this example embodiment an additional vehicle is also shown, identified as the adjacent vehicle 506, as operating adjacent to the platoon including the source vehicle 502 and an endpoint vehicle 504.

As with other embodiments described herein, the source vehicle 502 is configured to optically communicate data to the endpoint vehicle 504 for any suitable purpose. For example, the source vehicle 502 can communicate, without limitation, current, past, or future: state information; braking information; navigation information; acceleration information; passenger information; location information; lane information; speed information; destination information; battery capacity information; maintenance information; road hazard information; weather information; temperature information; image/video information; payment information; odometer information; door status information; lock status information; emergency information; road sign information; road temperature information; precipitation information; roadway obstruction information; police or law enforcement information; traffic information; and so on.

In addition, the source vehicle 502 can communicate data to an event-driven digital camera (not shown) in the endpoint vehicle 504 related to other passenger vehicles or non-passenger vehicles (e.g., within a platoon including both the source vehicle 502 and the endpoint vehicle 504, or vehicles in other lanes, such as the adjacent vehicle 506). More specifically, the source vehicle 502 can communicate to the endpoint vehicle 504 information about other passenger vehicles—whether autonomous or otherwise—in front of the source vehicle 502.

To facilitate communication with the endpoint vehicle 504, the source vehicle 502 includes a set of vertically-oriented arrays of independently-controllable light-emitting elements, each of which is identified as the state/code transmitter 508.

The other passenger vehicles of the passenger vehicle optical communication system 500 can include similar elements; a vertically-oriented array of independently-controllable light-emitting elements 510 can be incorporated by the endpoint vehicle 504 and a vertically-oriented array of independently-controllable light-emitting elements 512 can be incorporated by the adjacent vehicle 506.

It may be appreciated that the each vertically-oriented array of independently-controllable light-emitting elements of each vehicle of the passenger vehicle optical communication system 500 can be configured in an identical or similar manner. However, this is merely one configuration; other embodiments can be implemented in other ways. For example, in other embodiments, a passenger vehicle such as described herein includes a horizontally-oriented array of independently-controllable light-emitting elements. In other cases, a linear array of independently-controllable light-emitting elements can be oriented in any other manner and/or may be disposed or arranged in any suitable manner (e.g., within a bumper of the passenger vehicle, within a window of a passenger vehicle, and so on).

Accordingly, for simplicity of description, the embodiments that follow reference the vertically-oriented array of independently-controllable light-emitting elements 508 of the source vehicle 502 only.

In the illustrated example, the source vehicle 502 and the endpoint vehicle 504 are separated by a headway that may be variable (e.g., based on speed or road conditions) or that may be substantially fixed and/or otherwise maintained by the source vehicle 502 and the endpoint vehicle 504.

As noted above, the source vehicle 502 and the endpoint vehicle 504 can be any suitable passenger vehicles; example passenger vehicles are non-exhaustively listed above. The source vehicle 502 includes a state/code transmitter (not shown) that, in turn, includes at least one light emitting element array. In typical embodiments, the state/code transmitter includes an array of light emitting elements that are each individually addressable. As a result of this construction, the source vehicle 502 can operate the state/code transmitter to project a series of one-dimensional patterns that can be read, detected, or otherwise observed by one or more event-driven digital cameras (or any other suitable light-sensitive element or array of elements, whether event-driven or otherwise) in the endpoint vehicle 504.

As noted above, the endpoint vehicle 504 can also include an image processing circuit/processor configured to decode, decrypt, or otherwise interpret the information transmitted from the source vehicle 502 and, additionally or alternatively, to de-skew and/or otherwise correct or reorient images captured by the event-driven digital camera of the endpoint vehicle 504.

For example, FIGS. 5B-5C are provided to show example one-dimensional patterns 514a, 514b that can be transmitted by the source vehicle 502 to the endpoint vehicle 504 to communicate information to the endpoint vehicle 504. In these figures, digital information can be conveyed through contrast between different regions or sections of a particular vertical pattern (e.g., barcode). More specifically, light emitting elements may not be illuminated (e.g., the pattern section 516) whereas other sections may be illuminated (e.g., the pattern section 518).

In some cases, the state/code transmitter—or a portion thereof, such as a lens—can extend at least partially through the exterior surface of the source vehicle 502, although this is not required. In some cases, a protective cover (e.g., lens window) can be provided in, or defined by, the exterior surface of the source vehicle 502. In these embodiments, the state/code transmitter of the source vehicle 502 is positioned behind, and at least partially protected by, the protective cover.

In still other embodiments, the state/code transmitter can be aesthetically or visually hidden by one or more body panels of the source vehicle 502. In these examples, one or more portions of the body of the source vehicle 502 may be at least partially transparent to light emitted by the state/code transmitter of the source vehicle 502.

As with other embodiments described herein, the state/code transmitter of the source vehicle 502 is configured to project a sequence of linear or otherwise one dimensional patterns—also referred to as frames—across the headway distance toward the endpoint vehicle 504.

It may be appreciated that the foregoing description of FIG. 5A-5C, and the various alternatives thereof and variations thereto are presented, generally, for purposes of explanation, and to facilitate a thorough understanding of various possible configurations of a passenger vehicle optical communication system including a source vehicle configured to transmit information to an endpoint vehicle by modulating and/or otherwise controlling a linear array of light emitting elements. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

For example, as noted with respect to other embodiments described herein, it may be appreciated that each depicted passenger vehicle can be configured to operate as either or both a source vehicle or an endpoint vehicle, such as described herein. For example, the passenger vehicle may be configured to transmit to and receive information from the passenger vehicle 504 and to transmit to and receive information from the passenger vehicle 506. In these examples, it is understood that all passenger vehicles of an autonomous transport system, such as described herein, can include hardware such as a state/code transmitter system (more generally, "transmitter") with at least one array of light emitting elements and, additionally, can include hardware such as an event-driven digital camera (more generally "receiver").

In further embodiments, each passenger vehicle can include multiple transmitters and multiple receivers such that the passenger vehicle can optically communicate with other passenger vehicles regardless of where such vehicles are positioned relative to the passenger vehicle. For example, as illustrated, each passenger vehicle shown in FIG. 5A is substantially rectangular. In this example, the passenger vehicles can include four separate transmitters and four separate receivers, each associated with a corner or side of the passenger vehicle in order to optically communicate with passenger vehicles at any position relative to the passenger vehicle (e.g., front, behind, to the left, to the right, and so on).

In these examples, a passenger vehicle can include a master controller or processor that obtains information from each transmitter and each receiver of the optical communication system. The information received from each transmitter and each receiver can be analyzed, used, stored, or interpreted at least in part based on a direction of travel of the passenger vehicle and at least in part on the location of each respective transmitter and each respective receiver.

For example, if a passenger vehicle receives information from a forward-facing receiver, a master controller can categorize such information as received from a vehicle leading the passenger vehicle. Similarly, if a passenger vehicle receives information from a rearward-facing receiver, a master controller can categorize such information as received from a vehicle trailing the passenger vehicle. Similarly, if a passenger vehicle receives information from a left-side receiver, a master controller can categorize such information as received from a vehicle to the left of the passenger vehicle. Similarly, if a passenger vehicle receives information from a right-side receiver, a master controller can categorize such information as received from a vehicle to the right of the passenger vehicle.

Further, it may be appreciated that similar to other embodiments described herein, a passenger vehicle of an autonomous transport system may symmetrically dispose transmitters and receivers relative to the front, back, left, and right sides of the vehicle.

As noted above, a passenger vehicle optical communication system, such as described herein, need not be limited to transmitting and receiving the linear patterns or codes described in reference to FIGS. 5A-5C. For example, generally and broadly, FIGS. 6A-6C depict an example passenger vehicle optical communication system in which information can be transmitted and received by and between passenger vehicles by selectively modulating and/or otherwise controlling the two-dimensional spatial distribution (e.g., two-dimensional pattern), amplitude, frequency, phase, polarization, angle, pulse width, duty cycle, and/or any other suitable characteristic of visible or traditionally non-visible light emitted from a light emitting region of a source vehicle and that may be detected by a digital camera of an endpoint vehicle.

Figure 6A:
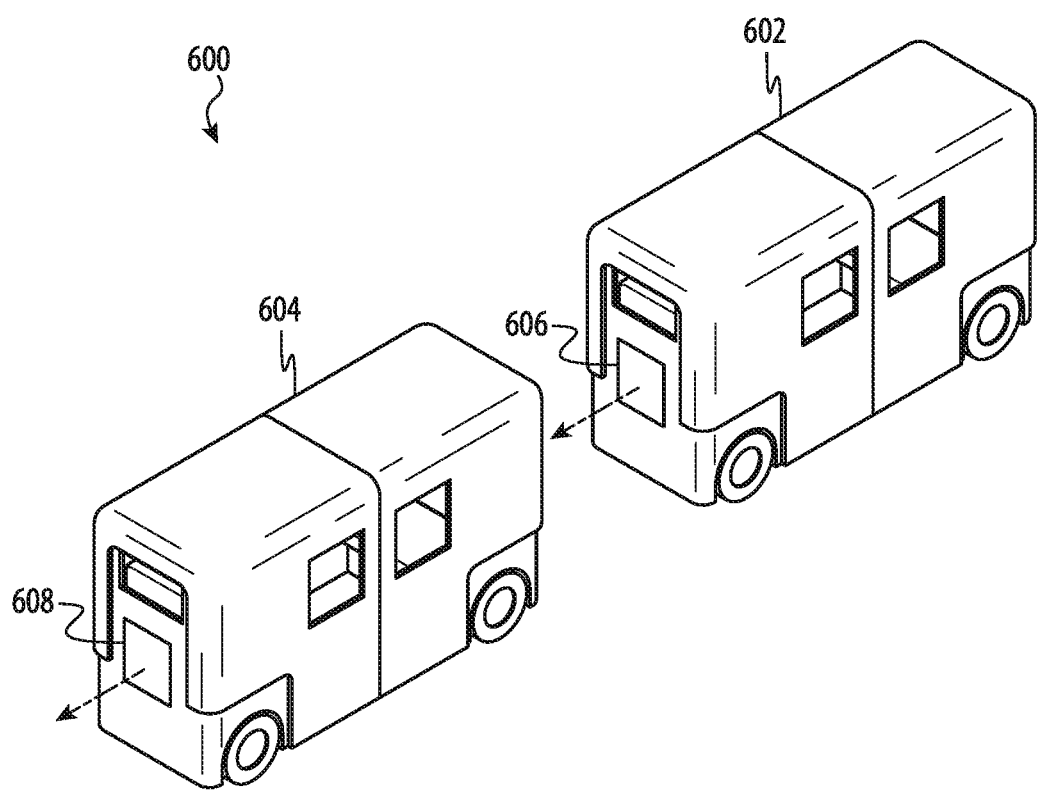
FIG. 6A depicts another example of a passenger vehicle optical communication system in which a source vehicle transmits state (or other) information to one or more endpoint vehicles by transmitting a sequence of two-dimensional patterns from a light source.
Figures 6B, 6C:
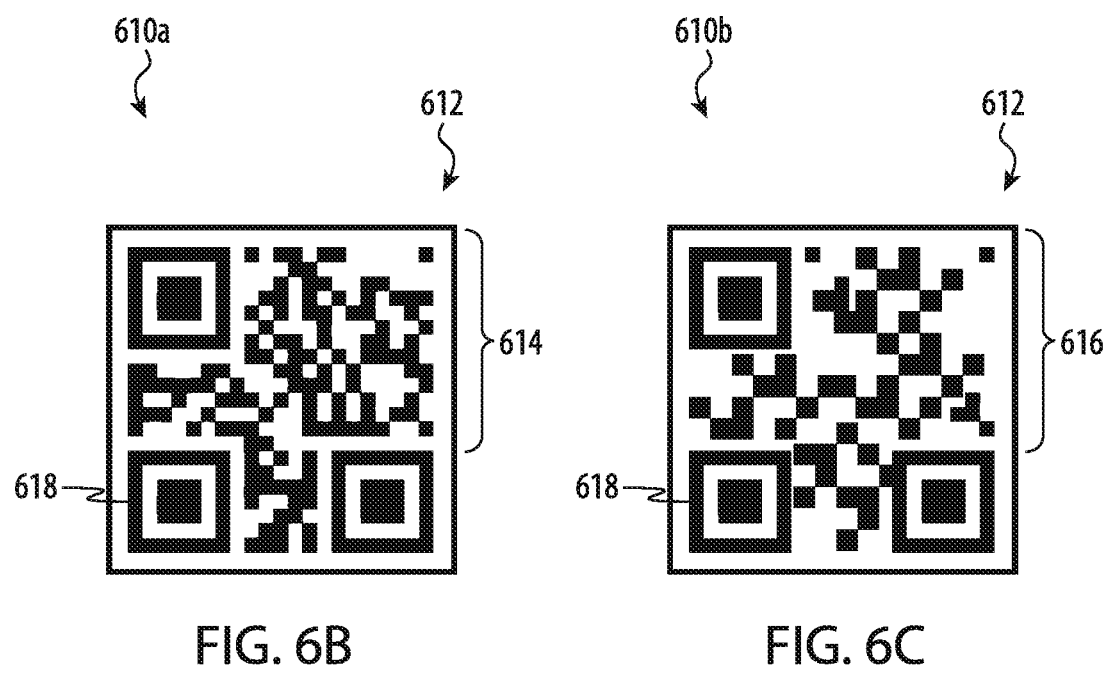
FIGS. 6B-6C each depict example two-dimensional patterns that can be transmitted by the source vehicle of the passenger vehicle optical communication system of FIG. 6A.

FIG. 6A depicts a passenger vehicle optical communication system 600 optically coupling a number of passenger vehicles, including a source vehicle 602 and an endpoint vehicle 504 that are aligned in a platoon formation. Each of the source vehicle 602 and the endpoint vehicle 604 can be configured in a similar manner as described above; this description is not repeated.

In this example, the source vehicle 602 includes a state/code transmitter 606 that is characterized by a two-dimensional array of independently-controllable light-emitting elements. The state/code transmitter 606 is configured to transmit or project a sequence or series of two-dimensional optical patterns (e.g., matrix codes, QR codes, and so on) to convey information to another passenger vehicle, such as the endpoint vehicle 604. Example two-dimensional codes that can be transmitted by the state/code transmitter 606 to the endpoint vehicle 604 are shown in FIGS. 6B-6C. These matrix codes 610*a*, 610*b* are each characterized by well-defined edges 612 that can be detected and/or recognized by an event-driven digital camera or other system (e.g., an image processing circuit) or hardware of a receiver, such as described herein. The matrix codes 610*a*, 610*b* also include one or more data matrices 614, 616 that may change from frame to frame to convey different information to a passenger vehicle. The matrix codes 610*a*, 610*b* can also include one or more fiducials or markers 618 that assist an event-driven digital camera or other system (e.g., an image processing circuit) or hardware of a receiver in determining an orientation and position of the source vehicle relative to the endpoint vehicle.

Figure 7A:
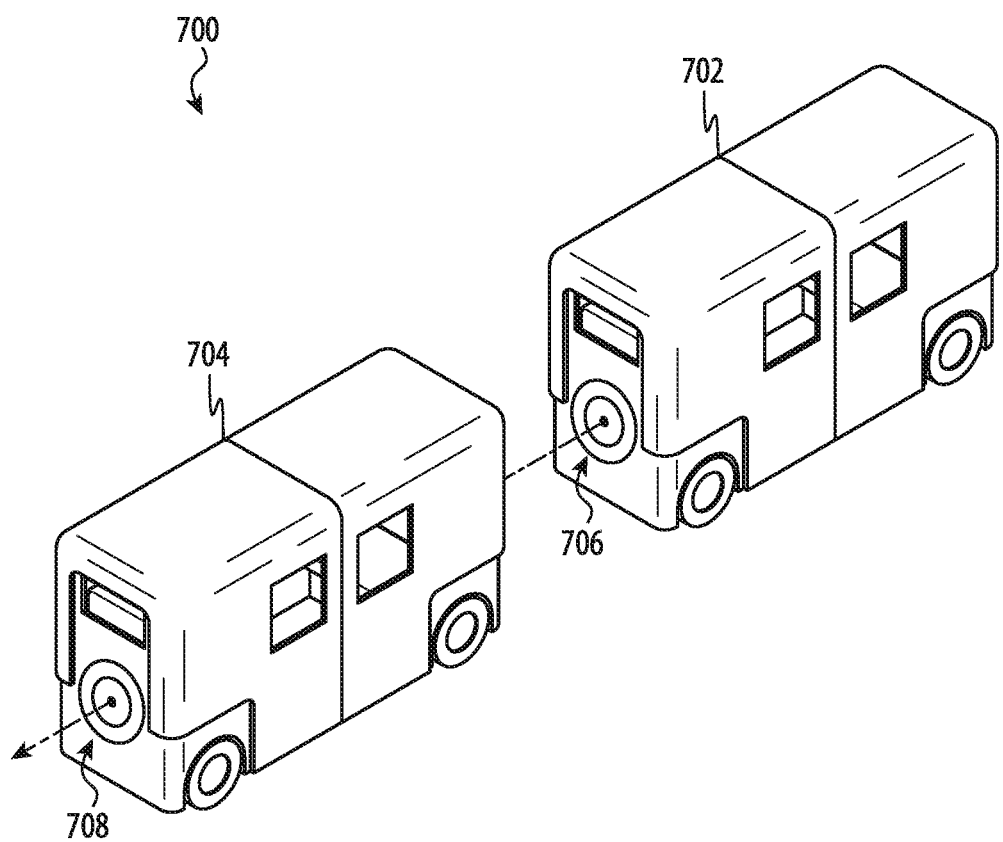
FIG. 7A depicts another example of a passenger vehicle optical communication system in which a source vehicle transmits state (or other) information to one or more endpoint vehicles by transmitting a sequence of circular patterns from a light source.
Figure 7B:
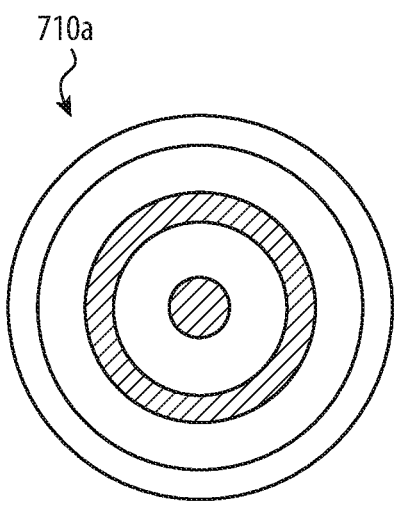
FIGS. 7B-7C each depict example circular patterns that can be transmitted by the source vehicle of the passenger vehicle optical communication system of FIG. 7A.
Figure 7C:
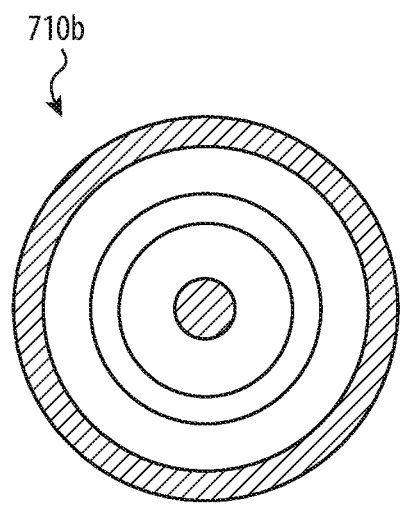

Still other embodiments can be implemented in other ways. FIG. 7A depicts another example of a passenger vehicle optical communication system 700 in which a source vehicle 702 transmits state (or other) information to one or more endpoint vehicles, such as the endpoint vehicle 704, by transmitting a sequence of circular patterns from a light source or circular array 706. FIGS. 7B-7C each depict example circular patterns 710*a*, 710*b* that can be transmitted by the source vehicle of the passenger vehicle optical communication system of FIG. 7A. It may be appreciated that the number of concentric circles (or other shapes) can vary from embodiment to embodiment. Further, it may be understood that any other suitable concentric shape or shape(s) can be used by a state/code transmitter such as described herein.

Figure 8:
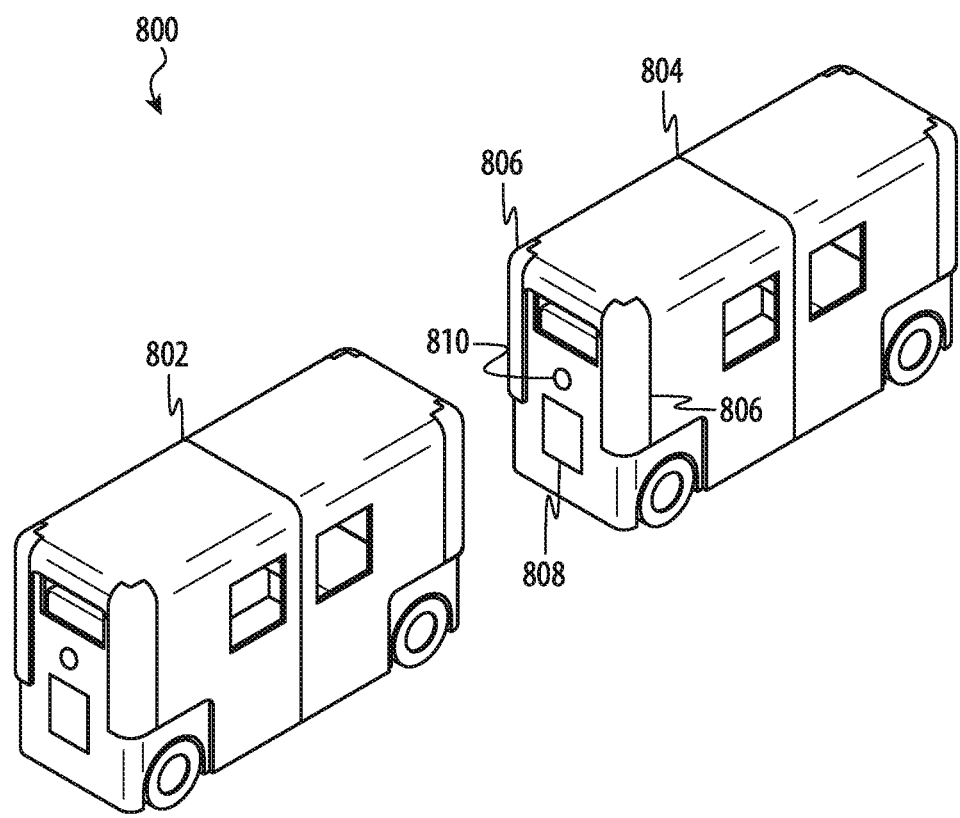
FIG. 8 depicts another example of a passenger vehicle optical communication system in which a source vehicle includes more than one optical communications transmitter.

FIG. 8 depicts another example of a passenger vehicle optical communication system 800 in which a passenger vehicle 802 is configured to communicate with a passenger vehicle 804 using one of multiple different optical communication transmitters and/or receivers. More specifically, the passenger vehicle 804 can include a linear array of light emitting elements 806 (see, e.g., FIGS. 5A-5C) that can communicate a first information or a first information or data type to the passenger vehicle 802 and, additionally, a two-dimensional array of light emitting elements 808 (see, e.g., FIGS. 6A-7C) that can communicate a second information or a second information or data type to the passenger vehicle 802. In addition, the passenger vehicle 804 can include an event-driven digital camera 810 that can receive information from the passenger vehicle 802.

The first information communicated by the linear array of light emitting elements 806 of the passenger vehicle 804 can be the same information as the second information communicated by the two-dimensional array of light emitting elements 808, but this may not be required. For example, in some cases, the two-dimensional array of light emitting elements 808 may be a "primary" optical communication method whereas the linear array of light emitting elements 806 of the passenger vehicle 804 may be a "secondary," "auxiliary," "failover," or "redundant" optical communication method.

In view of the preceding example, it may be appreciated that a passenger vehicle of an autonomous transport system, such as described herein, can include any suitable number of optical communication transmitters and any suitable number of optical communication receivers. The various transmitters and receivers can be cooperatively controlled and/or operated by a master controller or, in other cases, may be independently operated. Further, the various optical communication transmitters and receivers may be configured to operate with the same or different bandwidths, the same or different encryption or encoding schemes, the same or different wavelengths of light, and so on. The various transmitters and receivers can be operated simultaneously, or may be multiplexed with one another. Some transmitters may be dedicated to communicate a first information type to other passenger vehicles nearby and other transmitters may be dedicated to communicate a second information type to other passenger vehicles nearby. For example, the two-dimensional array of light emitting elements 808 may be used only to communicate information relevant to a platoon formation (e.g., speed, braking information, traffic information, roadway condition information, passenger information, and so on), whereas the linear array of light emitting elements 806 may be used to only to communicate navigation information (e.g., lane change operations, drop off locations, and so on).

In some embodiments, a passenger vehicle (or a component of a passenger vehicle, such as a master controller coupled to one or more discrete optical communication transmitters or receivers) may switch between different transmitters and receivers and/or may modify the behavior or function of one or more transmitters or receivers based on one or more environmental or operational conditions. Such conditions include, but are not limited to: distance between passenger vehicles in a platoon formation; speed of passenger vehicles in a platoon formation; air quality; temperature; dew point; humidity; pollution; vandalism; equipment failure or damage; and so on. In many cases, a change in one or more environmental or operational conditions can be detected by a second or sensor group of a passenger vehicle (e.g., camera, temperature sensor, humidity sensor, and so on).

For example, if a first passenger vehicle is separated by a large distance from a second passenger vehicle in a platoon formation, optical communication using a two-dimensional array of light emitting elements may be difficult; an event-driven digital camera may not be able to reliably image the two-dimensional array. In this example, the resolution of a pattern and/or rate at which a sequence of patterns is transmitted by the two-dimensional array of light emitting elements may be reduced. In this example, it may be appreciated that although bandwidth and data rate may be reduced, optical communication between the first passenger vehicle and the second passenger vehicle is maintained.

In an opposite example, as a headway distance between a first passenger vehicle and a second passenger vehicle decreases, the resolution, bandwidth, and data rate of optical information transmitted by the two-dimensional array of light emitting elements can be increased.

In other examples, a passenger vehicle may switch between different optical communication transmitters and optical communication receivers.

The foregoing example embodiments are no exhaustive; it is appreciated that a passenger vehicle, such as described herein, can incorporate any number of optical communication transmitters and receivers, positioned anywhere relative to an exterior of a passenger vehicle (including on a roof, or oriented downwardly toward the roadway), and so on.

Figure 9A:
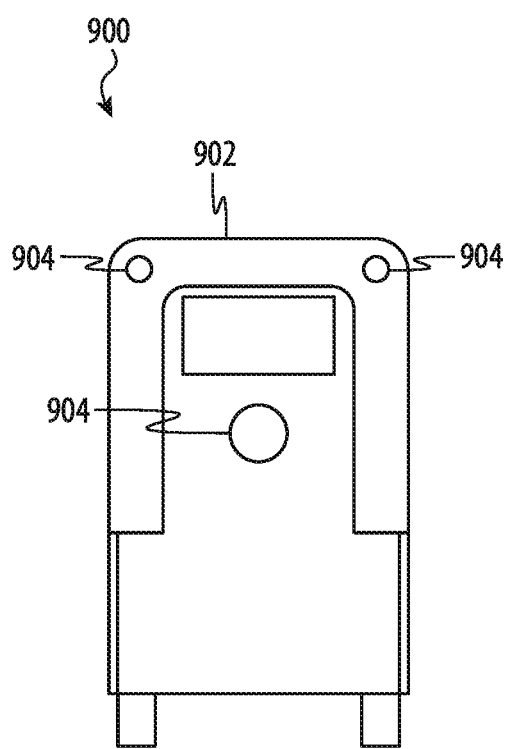
FIGS. 9A-9B depict another example of a passenger vehicle optical communication system in which an endpoint vehicle includes more than one optical communications receiver to detect transmissions from a light source of a source vehicle.
Figure 9B:
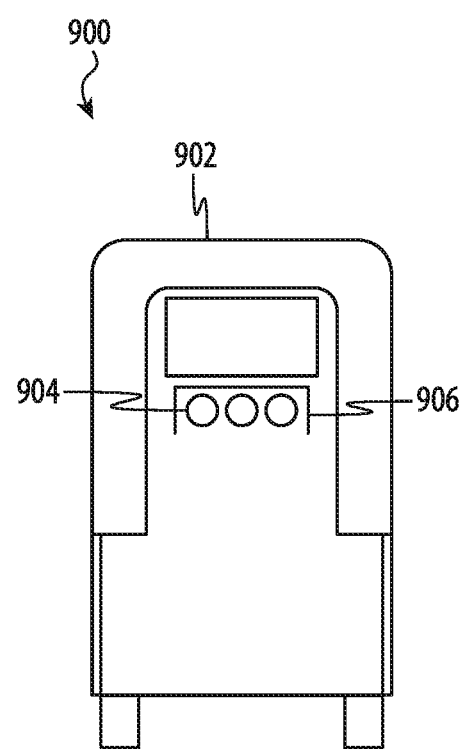

FIGS. 9A-9B depicts another example of a passenger vehicle optical communication system 900 in which an endpoint vehicle 902 includes more than one optical communications receiver (e.g., a digital camera, event-driven digital camera, or other light-sensitive element or array of elements) to detect transmissions from a light source of a source vehicle. In particular, in FIG. 9A, three different and discrete optical communications receivers 904 are shown. The discrete optical communications receivers 904 can be disposed in different locations of the endpoint vehicle 902. In some cases, the discrete optical communications receivers 904 are oriented to receive light from the same direction, but this may not be required; some of the discrete optical communications receivers 904 can be oriented to, or may be optically adapted to (e.g., via a lens or mirror or other optical structure), detect light from a port or starboard side of the endpoint vehicle 902. The discrete optical communications receivers 904 can each be the same type of optical communications receiver, but this is not required. The discrete optical communications receivers 904 can be simultaneously operated or may be operated independently.

In some cases, the discrete optical communications receivers 904 can be covered by a protective cover or hood 906 that can reduce environmental interference with the operation of the discrete optical communications receivers 904. The cover or hood 906 can be made from any number of suitable materials in any number of suitable shapes or configurations.

It may be appreciated that the foregoing description of FIG. 5A-9B, and the various alternatives thereof and variations thereto are presented, generally, for purposes of explanation, and to facilitate a thorough understanding of various possible configurations of a passenger vehicle optical communication system such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

For example, it may be understood that, generally and broadly, an autonomous transport system, such as described herein typically includes a set or number of identically or similarly configured passenger vehicles that may be configured to communicate with one another via an optical communication system, such as described herein. The optical communication, as noted above, typically takes place by and between passenger vehicles in a platoon formation, but this is not required; some passenger vehicles can receive or transmit data via an optical communication system to infrastructure devices (e.g., devices installed in or nearby the roadway), law enforcement devices or vehicles, third-party devices or vehicles, and so on. Communication between the various passenger vehicles of an autonomous transport system is typically bidirectional, but this may not be required.

Figure 10A:
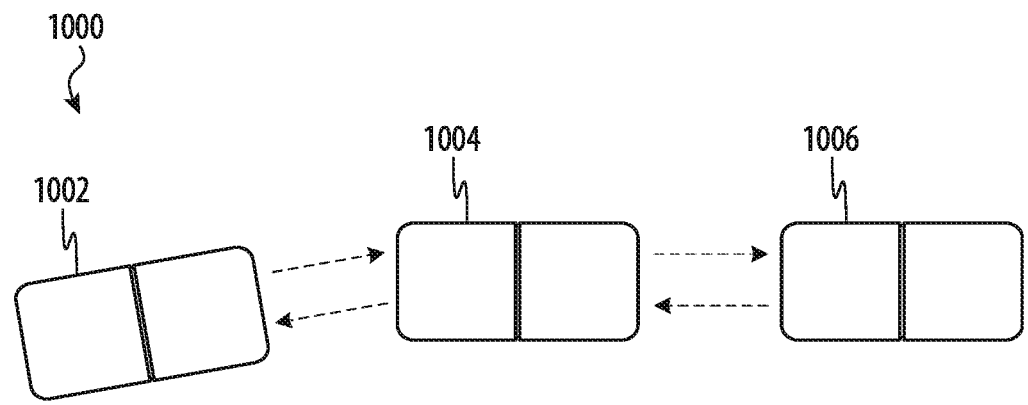
FIGS. 10A-10B depict a set of passenger vehicles operating in a platoon formation and bidirectionally-communicating via a passenger vehicle optical communication system, such as described herein.
Figure 10B:
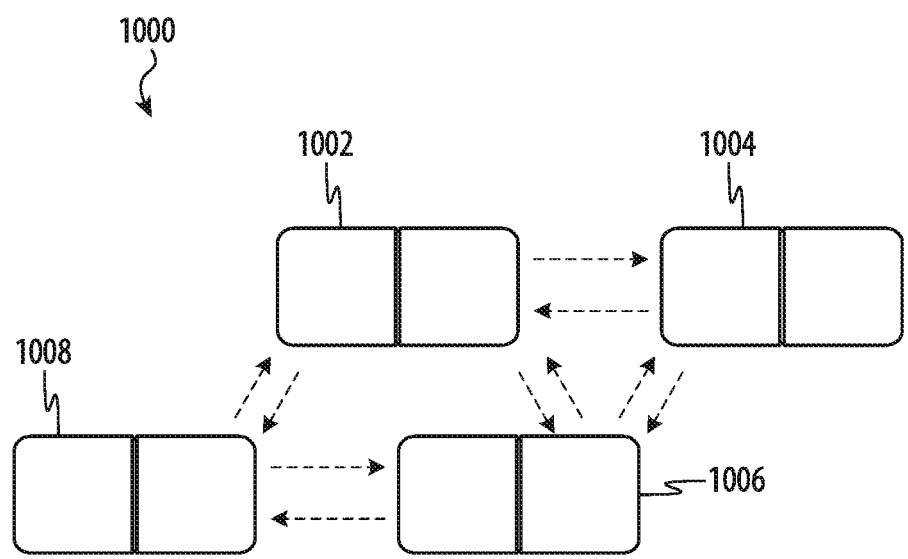

FIGS. 10A-10B depict a set of passenger vehicles operating in a platoon formation 1000 and bidirectionally-communicating via a passenger vehicle optical communication system, such as described herein. In FIG. 10A, a leading passenger vehicle 1002 is followed by two following passenger vehicles, one of which is identified as the middle passenger vehicle 1004 and one of which is identified as the trailing passenger vehicle 1006. It may be appreciated that, although not depicted in these figures for simplicity, each of the passenger vehicles shown can include at least one or more optical communications transmitters and at least one or more optical communications receivers such as described herein.

In this example, the leading passenger vehicle 1002 is positioned and oriented to communicate information to, and receive information from, the middle passenger vehicle 1004. Similarly, the middle passenger vehicle 1004 is positioned and oriented to communicate information to, and receive information from, the trailing passenger vehicle 1006.

The passenger vehicles can communicate any suitable information. For example, the leading passenger vehicle 1002 may communicate speed and/or braking information to the middle passenger vehicle 1004 that, in turn, can communicate speed and/or braking information to the trailing passenger vehicle 1006. In this manner, in typical implementations, information regarding a state or mode or operation of the leading passenger vehicle 1002 can be near instantaneously communicated to all vehicles in the platoon formation 1000.

In other examples, the trailing passenger vehicle 1006 can communicate information to the middle passenger vehicle 1004 that in turn can communicate to the leading passenger vehicle 1002.

In still further examples, any of the passenger vehicles of the platoon formation 1000 can communicate information related to a current state of another passenger vehicle in the platoon. In some cases, a passenger vehicle can communicate its own state information in addition to state information of other passenger vehicles or, additionally or alternatively, a passenger vehicle can communicate only state information from other passenger vehicles. More generally and broadly, it may be understood that a passenger vehicle such as described herein can be configured to send its own state information to other passenger vehicles and, additionally or alternatively, a passenger vehicle can be configured to forward, with or without alteration, state information of other passenger vehicles. In FIG. 10B, a leading passenger vehicle 1002 is followed by a single passenger vehicle identified as the following passenger vehicle 1004. In a second lane adjacent to the leading and following passenger vehicles are two other passenger vehicles that may be either moving in the same or a different direction than the leading passenger vehicle 1002 and the following passenger vehicle 1004. These vehicles are identified as the adjacent-lane passenger vehicles 1006, 1008.

In this example, substantially all passenger vehicles communicate information with all passenger vehicles nearby. For example, the leading passenger vehicle 1002 and the following passenger vehicle 1004 can each bidirectionally share information and/or communicate information to the adjacent-lane passenger vehicle 1006.

It may be appreciated that the foregoing description of FIG. 10A-10B, and the various alternatives thereof and variations thereto are presented, generally, for purposes of explanation, and to facilitate a thorough understanding of various possible benefits of bidirectional optical communication by and between a passenger vehicles. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

For example, it may be appreciated that in a platoon formation or otherwise, a passenger vehicle can communicate to nearby vehicles in any suitable manner. Information can be consumed and/or forwarded along a platoon formation such that information originating at a trailing passenger vehicle can be rapidly and quickly propagated through the platoon formation to the leading passenger vehicle and vice versa; information can be communicated in any direction between vehicles in a platoon formation, which may be a single line of vehicles in a single lane or may be a multi-lane platoon.

Passenger vehicles in a platoon formation can also modify one or more characteristics of information received from other passenger vehicles before forwarding such information to other passenger vehicles in a platoon formation. For example, a passenger vehicle may be configured to redact vehicle identifying information before forwarding such information.

Similarly, information communicated from various passenger vehicles in a platoon can be communicated for any suitable purpose. Examples of information that can be passed and shared by and between a number of cars in a platoon formation includes, without limitation, current, past, or future: state information; braking information; navigation information; acceleration information; passenger information; location information; lane information; speed information; destination information; battery capacity information; maintenance information; road hazard information; weather information; temperature information; image/video information; payment information; odometer information; door status information; lock status information; emergency information; road sign information; road temperature information; precipitation information; roadway obstruction information; police or law enforcement information; traffic information; and so on.

In addition, it may be appreciated that information may be communicated between passenger vehicles in a platoon formation for a number of suitable purposes. Examples include, but are not limited to: communicating an intention to change lanes; communicating a need to reduce speed; communicating presence of a roadway hazard, construction, or other obstruction; communicating presence of an emergency situation (e.g., on a roadway or within a passenger vehicle); communication of an upcoming navigation change (e.g., performing a maneuver or turn); communication of a change in roadway speed limit; communication of a current state or presence of a traffic flow regulation (e.g., stop sign, onramp meter, traffic light, and so on); communication of a low energy state (e.g., low battery, low fuel, and so on); communication of changing weather conditions (e.g., decreased temperature, precipitation, and so on); communication of absolute position errors or offsets; communication of a loss of position fix; communication of one or more hardware failures; and so on.

As one example, a passenger vehicle may receive an optical communication that a leading passenger vehicle is decelerating. In response, the passenger vehicle may correspondingly decelerate to maintain the headway distance between it and its leading vehicle.

As another example, a passenger vehicle may receive an optical communication that an adjacent vehicle intends to merge into the lane occupied by the passenger vehicle. In response, the passenger vehicle can accelerate or decelerate to establish a space sufficient for the adjacent vehicle to safely merge.

In addition, it may be appreciated that communication between passenger vehicles in a platoon formation can be triggered, initiated, or terminated in response to a number of suitable triggers or conditions. Examples include: a passenger vehicle joining a platoon; a passenger vehicle changing state (e.g., increasing speed, decreasing speed, braking, and so on); a passenger vehicle breaking formation (e.g., to drop off a passenger, for safety reasons, and so on); a passenger vehicle detecting a reportable condition (e.g., a change in weather, a stop request by a passenger, an emergency situation, external input, a hardware failure, a safety issue); and so on. In further examples, communication between passenger vehicles in a platoon formation can be constant or substantially constant; in these examples, information may be "streamed" at a substantially constant rate between passenger vehicles in any direction relative to the direction of travel of the platoon. In still further examples, communication between passenger vehicles in a platoon formation can occur at regular intervals. The interval at which communication between passenger vehicles occurs can change, can be negotiated between individual passenger vehicles, can be set by a preference or external setting, and so on. In some cases, passenger vehicles in a platoon formation can be configured to transmit a heartbeat or other "keep-alive" signal in order to maintain active communication between passenger vehicles.

It may be appreciated that the foregoing examples are not exhaustive. As such, it may be appreciated that passenger vehicles such as described herein can be configured to communicate with any suitable number of passenger vehicles, for any suitable purpose, in response to, or as a result of, any suitable trigger or condition.

In still further examples, optical communication between passenger vehicles may be one of a number of communication channels or links established between passenger vehicles. For example, in a platoon formation including two passenger vehicles, the two passenger vehicles can be communicably coupled via an optical communication system such as described herein. In addition, these passenger vehicles can be additionally communicably coupled via a Wi-Fi and/or a Bluetooth connection. In these examples, the optical communication "link" established between the passenger vehicles may be a primary or secondary/failover communication link.

In some cases, each passenger vehicle of a platoon or an autonomous transport system, such as described herein, can be a closed-loop state machine that holds in a memory various states of other passenger vehicles nearby it.

Figure 11:
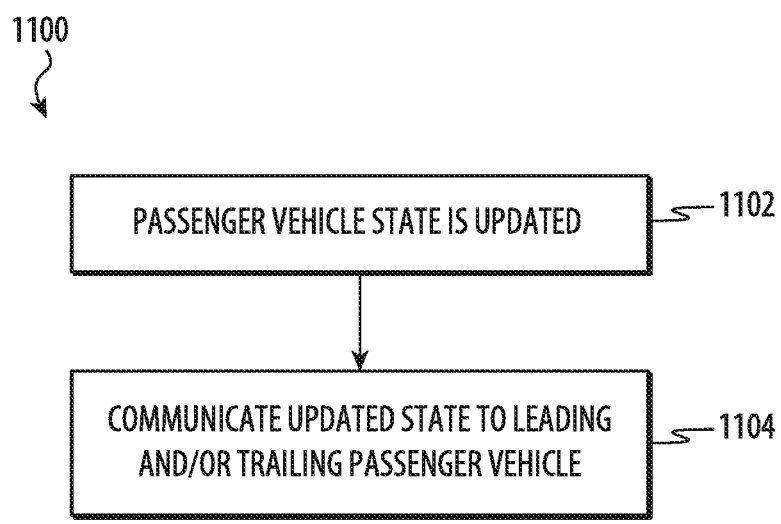
FIG. 11 is a flowchart depicting example operations of a method of transmitting state information between vehicles in a passenger vehicle optical communication system.
Figure 12:
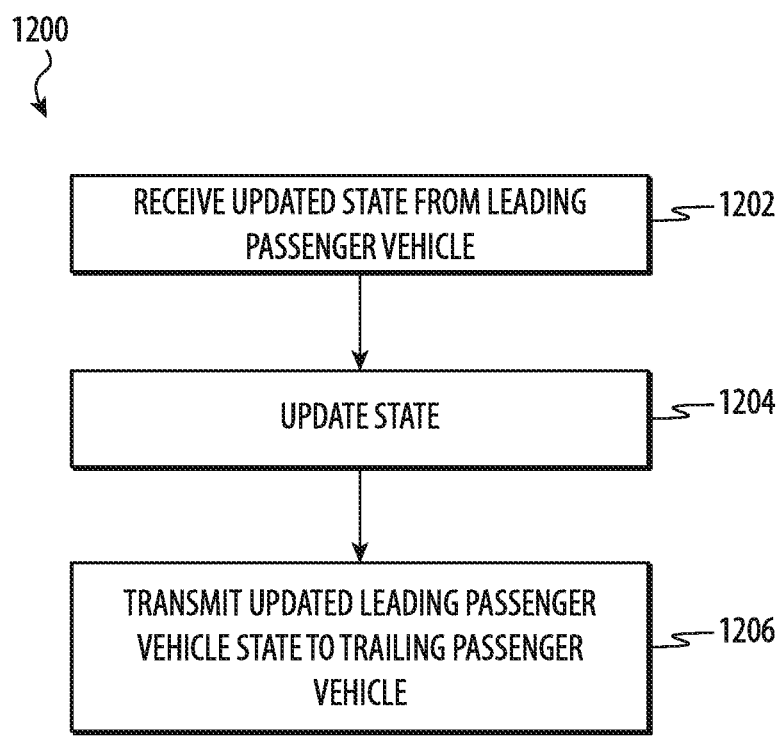
FIG. 12 is a flowchart depicting example operations of a method of forwarding state information between vehicles in a passenger vehicle optical communication system.
Figure 13:
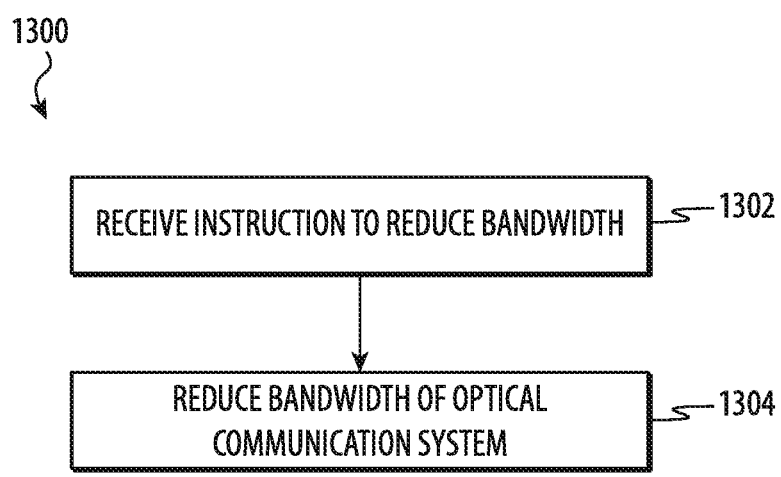
FIG. 13 is a flowchart depicting example operations of a method of adjusting bandwidth in a passenger vehicle optical communication system.

As such, generally and broadly, FIGS. 11-13 are provided to present example methods that may be associated with the operation of an optical communication system, such as described herein.

FIG. 11 is a flowchart depicting example operations of a method of transmitting state information between vehicles in a passenger vehicle optical communication system. The method 1100 can be performed by any suitable hardware, processor, or combination thereof included in a passenger vehicle, such as described herein. The method 1100 includes operation 1102 in which a passenger vehicle state is updated. An example is a velocity or speed state that has changed. Thereafter, at operation 1104, the passenger vehicle can operate an optical communications transmitter, such as described herein, to communicate the new and updated state, optionally along with an identifier and/or other metadata (e.g., state change time, state change rate, previous states, and so on).

FIG. 12 is a flowchart depicting example operations of a method of forwarding state information between vehicles in a passenger vehicle optical communication system. The method 1200 includes operation 1202 in which an updated state is received from a leading passenger vehicle. At operation 1204, a state of the receiving passenger vehicle can be updated. Finally, at operation 1206, the state of the receiving passenger vehicle is optically communicated to a trailing passenger vehicle.

FIG. 13 is a flowchart depicting example operations of a method of adjusting bandwidth in a passenger vehicle optical communication system. The method 1300 begins at operation 1302 in which an instruction is received to reduce bandwidth. The instruction can be received from another passenger vehicle or from a processor or component within the passenger vehicle itself. Thereafter, at operation 1304, bandwidth of optical communication can be changed (e.g., reducing resolution of a two-dimensional matrix code).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

For example, while the methods or processes disclosed herein have been described and shown with reference to particular operations performed in a particular order, these operations may be combined, sub-divided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. A passenger vehicle communication system for communication between vehicles on a roadway, the passenger vehicle communication system comprising:
   a source vehicle on the roadway, the source vehicle comprising:
      a vehicle state transmitter comprising:
         an array of light-emitting elements configured to emit light from at least a portion of an external surface in a direction opposite a travel direction of the source vehicle; and
         a drive circuit communicably coupled to the array of light-emitting elements and configured to cause the array of light-emitting elements to project a series of spatial patterns corresponding to a vehicle state of the source vehicle along the direction; and
   an endpoint vehicle on the roadway following the source vehicle by a distance, the endpoint vehicle comprising:
      a digital camera oriented in the travel direction and configured to receive light emitted by the array of light-emitting elements; and
      an image processing circuit communicably coupled to the digital camera and configured to convert changes in light detected by the digital camera into an array of digital values corresponding to the vehicle state of the source vehicle.

2. The passenger vehicle communication system of claim 1, wherein:
   the array of light-emitting elements is a first array of light-emitting elements;
   the external surface is a first external surface; and
   the vehicle state transmitter comprises a second array of light-emitting elements configured to emit light from at least a portion of a second external surface in the travel direction.

3. The passenger vehicle communication system of claim 2, wherein the source vehicle comprises:
   a first door defining the first external surface; and
   a second door, opposite the first door, defining the second external surface.

4. The passenger vehicle communication system of claim 2, wherein:
   the first array of light-emitting elements is arranged in a vertical orientation relative to the roadway; and
   the second array of light-emitting elements is arranged in a vertical orientation relative to the roadway.

5. The passenger vehicle communication system of claim 2, wherein at least one of:
   the first array of light-emitting elements is arranged in a horizontal orientation relative to the roadway; or
   the second array of light-emitting elements is arranged in a horizontal orientation relative to the roadway.

6. The passenger vehicle communication system of claim 2, wherein:
   the endpoint vehicle is a first endpoint vehicle;
   the distance is a first distance; and
   the passenger vehicle communication system further comprises a second endpoint vehicle on the roadway leading the source vehicle by a second distance;
   the drive circuit of the vehicle state transmitter of the source vehicle is configured to cause the second array of light-emitting elements to project the series of spatial patterns corresponding to the vehicle state of the source vehicle toward the second endpoint vehicle.

7. The passenger vehicle communication system of claim 1, wherein the digital camera is an event-driven digital camera.

8. The passenger vehicle communication system of claim 1, wherein the array of light-emitting elements is arranged in a single row.

9. The passenger vehicle communication system of claim 1, wherein the array of light-emitting elements is disposed relative to a window of the source vehicle.

10. The passenger vehicle communication system of claim 1, wherein the array of light-emitting elements is arranged in a two-dimensional pattern.

11. The passenger vehicle communication system of claim 10, wherein the two-dimensional pattern is a two-dimensional bar code.

12. A passenger vehicle communication system for optical communication between vehicles on a roadway, the passenger vehicle communication system comprising:
   a platoon of vehicles, each respective vehicle comprising:
      an array of photosensitive elements configured to receive light emitted in a first direction opposite a travel direction of the respective vehicle;
      an image processing circuit configured to convert changes in light detected by the array of photosensitive elements into an array of digital values corresponding to a first vehicle state of a leading vehicle;
      an array of light-emitting elements configured to emit light in a second direction opposite the travel direction of the respective vehicle; and a drive circuit configured to cause the array of light-emitting elements to project a series of spatial patterns corresponding to a second vehicle state of the respective vehicle toward a trailing vehicle.

13. The passenger vehicle communication system of claim 12, wherein the array of light-emitting elements of each respective vehicle is oriented vertically relative to the roadway.

14. The passenger vehicle communication system of claim 12, wherein the array of light-emitting elements of each respective vehicle is oriented horizontally relative to the roadway.

15. The passenger vehicle communication system of claim 12, wherein:
    the array of light-emitting elements of each respective vehicle is configured to emit infrared light; and
    the array of photosensitive elements of each respective vehicle is configured to receive infrared light.

16. The passenger vehicle communication system of claim 12, wherein the series of spatial patterns of each respective vehicle corresponds to the first vehicle state and the second vehicle state.

17. The passenger vehicle communication system of claim 8, wherein at least one pattern of the series of spatial patterns of each respective vehicle is a monochromatic pattern.

18. A method for optical communication between vehicles on a roadway, the method comprising:
    determining, at a leading vehicle, a message to communicate to a trailing vehicle;
    generating, at the leading vehicle, a first series of patterns corresponding to the message;
    iterating through the first series of patterns to illuminate an array of light-emitting elements of the leading vehicle with one pattern at a time;
    receiving, at the trailing vehicle, a second series of patterns from a camera oriented to capture light emitted from the array of light-emitting elements of the leading vehicle;
    converting, at the trailing vehicle, the second series of patterns into the message; and
    modifying an operation of the trailing vehicle based on the message.

19. A method for optical communication between vehicles on a roadway, the method comprising:
    determining, at a leading vehicle, a vehicle state to communicate to a trailing vehicle;
    generating, at the leading vehicle, a first series of patterns corresponding to the vehicle state;
    iterating through the first series of patterns to illuminate an array of light-emitting elements of the leading vehicle with one pattern at a time;
    receiving, at the trailing vehicle, a second series of patterns from a camera oriented to capture light emitted from the array of light-emitting elements of the leading vehicle;
    converting, at the trailing vehicle, the second series of patterns into the vehicle state; and
    modifying an operation of the trailing vehicle based on the vehicle state of the leading vehicle; wherein:
    the vehicle state comprises at least one of:
        a speed of the leading vehicle;
        an acceleration of the leading vehicle;
        destination information;
        route information; or
        passenger information.

20. A method for optical communication between vehicles on a roadway, the method comprising:
    determining, at a leading vehicle, a deceleration message for transmission to a trailing vehicle;
    generating, at the leading vehicle, a first series of patterns corresponding to the deceleration message;
    iterating through the first series of patterns to illuminate an array of light-emitting elements of the leading vehicle with one pattern at a time;
    receiving, at the trailing vehicle, a second series of patterns from a camera oriented to capture light emitted from the array of light-emitting elements of the leading vehicle;
    converting, at the trailing vehicle, the second series of patterns into the deceleration message; and
    change an acceleration parameter of the trailing vehicle based on the deceleration message.

* * * * *